(12) United States Patent
Enoshita et al.

(10) Patent No.: US 10,363,552 B2
(45) Date of Patent: Jul. 30, 2019

(54) HONEYCOMB FIRED BODY, HONEYCOMB FILTER, AND METHOD FOR PRODUCING HONEYCOMB FIRED BODY

(71) Applicant: IBIDEN CO., LTD., Ogaki-shi (JP)

(72) Inventors: Shunpei Enoshita, Ibi-gun (JP); Satoshi Shinohara, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 140 days.

(21) Appl. No.: 15/451,415

(22) Filed: Mar. 7, 2017

(65) Prior Publication Data

US 2017/0173574 A1 Jun. 22, 2017

Related U.S. Application Data

(63) Continuation of application No. PCT/JP2015/075442, filed on Sep. 8, 2015.

(30) Foreign Application Priority Data

Sep. 8, 2014 (JP) ................................ 2014-182460

(51) Int. Cl.
B01J 35/04 (2006.01)
B28B 3/20 (2006.01)
(Continued)

(52) U.S. Cl.
CPC ............ B01J 35/04 (2013.01); B01D 46/247 (2013.01); B01D 46/2474 (2013.01);
(Continued)

(58) Field of Classification Search
CPC .... B01D 2046/2481; B01D 2046/2488; B01D 2255/1021; B01D 2255/1023;
(Continued)

(56) References Cited

U.S. PATENT DOCUMENTS

2007/0128405 A1* 6/2007 Sakaguchi ......... B01D 46/0001
428/116
2007/0130897 A1* 6/2007 Sakaguchi ......... B01D 46/0001
55/523

FOREIGN PATENT DOCUMENTS

EP 1384508 1/2004
EP 1787702 5/2007
(Continued)

*Primary Examiner* — David Sample
*Assistant Examiner* — Elizabeth Collister
(74) *Attorney, Agent, or Firm* — Mori & Ward, LLP

(57) ABSTRACT

Provided is a honeycomb fired body in which the pressure loss in the initial state where PM has not accumulated is sufficiently low, the strength is sufficiently high, and the heat capacity is not small. The honeycomb fired body of the present invention is a honeycomb fired body including a plurality of cells in each of which one end is plugged and which serve as channels of exhaust gas, and porous cell partition walls that define the cells, wherein the honeycomb fired body is formed of SiC, the plurality of cells include peripheral cells located at an outermost peripheral region of the honeycomb fired body and inner cells located more inward than the peripheral cells, all the inner cells have the same cross-sectional shape that is a rectangle in a plane perpendicular to the longitudinal direction thereof, each peripheral cell is defined by the cell partition walls and an outer wall forming a periphery of the honeycomb fired body, the cell partition walls in contact with the outer wall each have a thick wall region where the wall thickness gradually increases toward the outer wall, the cross-sectional shape of the peripheral cells in a plane perpendicular to the longitudinal direction thereof is a shape formed by reducing the rectangular cross-sectional shape of the inner cells to obtain a reduced rectangle and chamfering or rounding two corners of the reduced rectangle, the cross-sectional area of each peripheral cell in a plane perpendicular to the longitudinal (Continued)

direction thereof is 60 to 80% of the cross-sectional area of each inner cell in a plane perpendicular to the longitudinal direction thereof, the cell partition walls include inter-peripheral-cell cell partition walls each located between the peripheral cells and inter-inner-cell cell partition walls each located between the inner cells, and the minimum thickness of the inter-peripheral-cell cell partition walls is greater than the thickness of the inter-inner-cell cell partition walls.

11 Claims, 12 Drawing Sheets

(51) Int. Cl.
*B01D 46/24* (2006.01)
*B01D 53/94* (2006.01)
*B28B 3/26* (2006.01)
*F01N 3/022* (2006.01)
*C04B 35/565* (2006.01)
*C04B 38/00* (2006.01)
*B01J 27/224* (2006.01)
*C04B 111/00* (2006.01)

(52) U.S. Cl.
CPC ............... *B01D 53/94* (2013.01); *B28B 3/20* (2013.01); *B28B 3/269* (2013.01); *C04B 35/565* (2013.01); *C04B 38/0006* (2013.01); *F01N 3/0222* (2013.01); *B01D 2046/2481* (2013.01); *B01D 2046/2488* (2013.01); *B01D 2255/1021* (2013.01); *B01D 2255/1023* (2013.01); *B01D 2255/1025* (2013.01); *B01D 2255/2022* (2013.01); *B01D 2255/2027* (2013.01); *B01D 2255/2042* (2013.01); *B01J 27/224* (2013.01); *B28B 2003/203* (2013.01); *C04B 2111/0081* (2013.01); *C04B 2111/00793* (2013.01); *C04B 2235/3826* (2013.01); *C04B 2235/5436* (2013.01); *C04B 2235/5445* (2013.01); *C04B 2235/5472* (2013.01); *F01N 2330/32* (2013.01); *F01N 2330/34* (2013.01); *Y02T 10/20* (2013.01)

(58) Field of Classification Search
CPC .... B01D 2255/1025; B01D 2255/2022; B01D 2255/2027; B01D 2255/2042; B01D 46/247; B01D 46/2474; B01D 53/94; B01J 27/224; B01J 35/04; B28B 2003/203; B28B 3/20; B28B 3/269; C04B 38/0009; F01N 2330/32; F01N 2330/34; F01N 3/0222; Y02T 10/20
See application file for complete search history.

(56) References Cited

FOREIGN PATENT DOCUMENTS

| EP | 1787969 | 5/2007 |
|---|---|---|
| JP | 54-150406 | 11/1979 |
| JP | 03-151049 | 6/1991 |
| JP | 2003-094415 | 4/2003 |
| WO | WO 2007/058006 | 5/2007 |
| WO | WO 2007/058007 | 5/2007 |
| WO | WO 2013/008795 | 1/2013 |

* cited by examiner

CROSS-SECTIONAL VIEW TAKEN ALONG LINE A-A

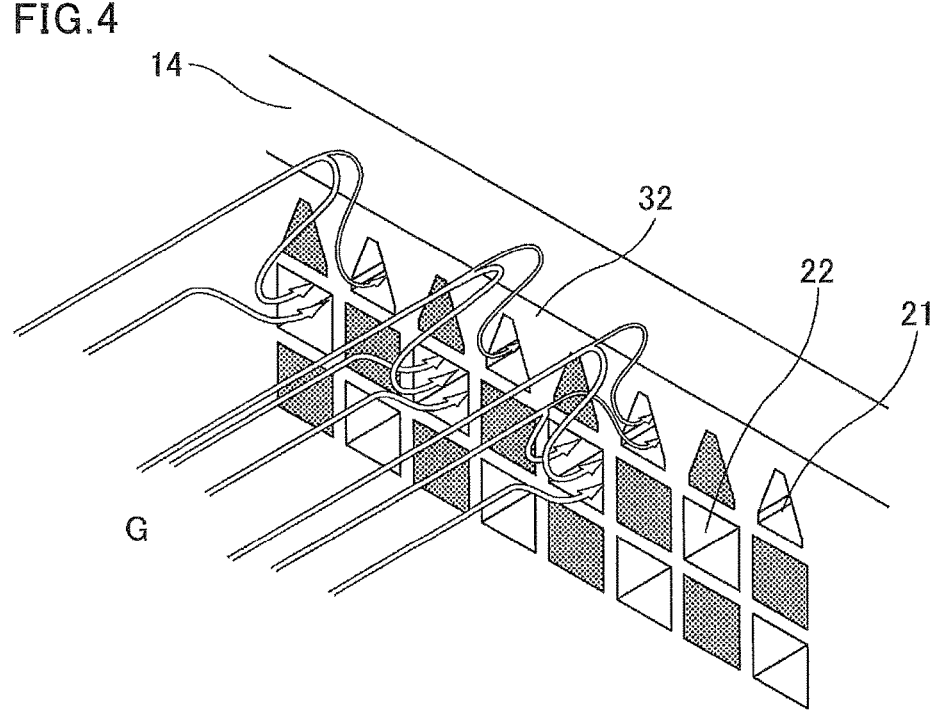

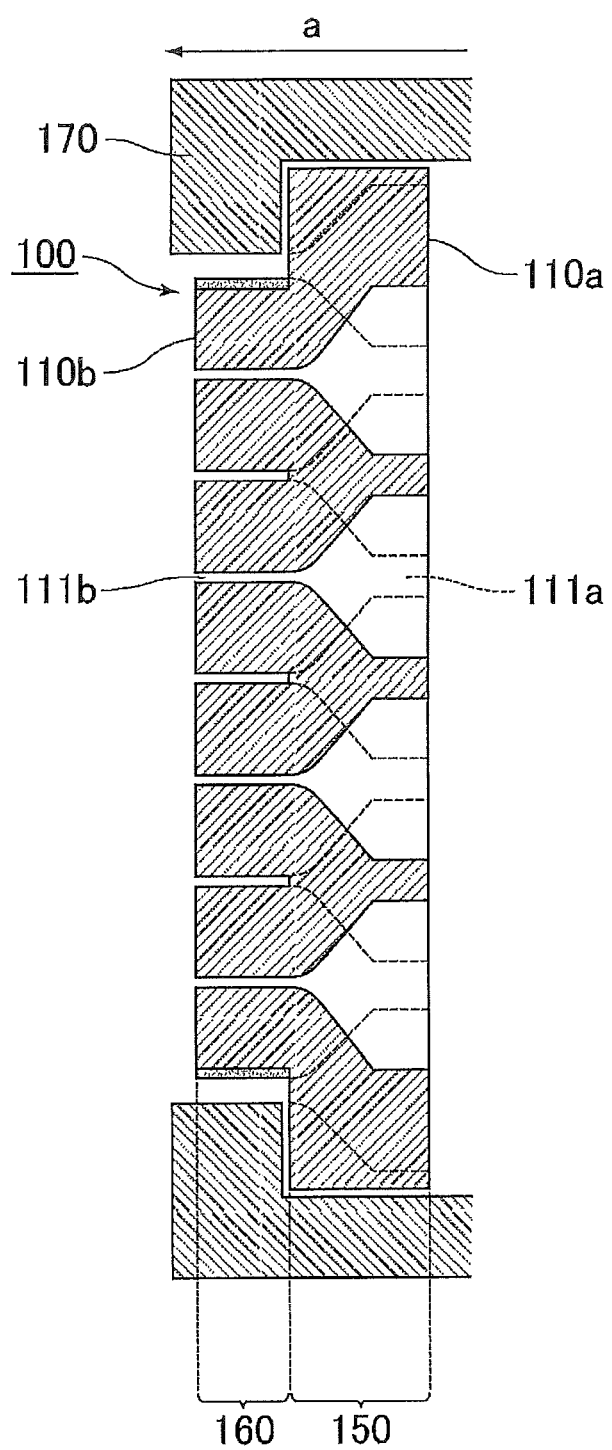

HONEYCOMB FIRED BODY, HONEYCOMB FILTER, AND METHOD FOR PRODUCING HONEYCOMB FIRED BODY

TECHNICAL FIELD

The present invention relates to a honeycomb fired body, a honeycomb filter, and a method for producing the honeycomb fired body.

BACKGROUND ART

Particulates (hereinafter also referred to as PM or soot) such as soot in exhaust gas emitted from internal combustion engines including diesel engines cause damage to the environment and human bodies, which has been a problem. Since exhaust gas contains toxic gas components such as CO, HC, and NOx, there has also been a concern for the influences of the toxic gas components on the environment and human bodies.

Thus, various filters having honeycomb structures (honeycomb filters) formed of porous ceramic such as cordierite and silicon carbide have been proposed as exhaust gas purifying apparatuses. Such honeycomb filters are connected to internal combustion engines to capture PM in exhaust gas, or to purify toxic gas components such as CO, HC, and NOx in the exhaust gas.

In addition, in order to improve fuel economy of internal combustion engines and to eliminate problems during driving attributed to the increase in pressure loss, there is a demand for a honeycomb filter in which the initial pressure loss is low or a honeycomb filter in which the increase rate of pressure loss after the accumulation of a certain amount of PM is low.

Increasing the aperture ratio is an effective means to reduce the pressure loss. Yet, increasing the aperture ratio entails a decrease in the thickness of cell partition walls. This makes it difficult to ensure the strength of the honeycomb fired body.

In the honeycomb fired body, maintaining the pressure loss at a low level and ensuring the strength are conflicting properties that are difficult to obtain simultaneously.

To solve the above problems, Patent Literature 1 discloses a honeycomb filter with an improved cell structure.

Specifically, Patent Literature 1 discloses a honeycomb structured body formed by combining a plurality of porous ceramic members with one another with an adhesive layer therebetween. Each porous ceramic member includes cells longitudinally arranged in parallel across cell partition walls, and an outer wall at the periphery of the porous ceramic member. The outer wall of the porous ceramic member is thicker than the cell partition walls. At least one cell located at the outermost periphery of the porous ceramic member is provided with a filling material at at least one corner of the cell to fill the corner.

FIG. 13 is a cross-sectional view of the porous ceramic member constituting the honeycomb structured body disclosed in Patent Literature 1 in a plane perpendicular to the longitudinal direction of the porous ceramic member. In this cross section, each square cell 221a, which is located at the outermost periphery and is partitioned by the cell partition walls extending perpendicular to an outer wall 223a of a porous ceramic member 220, is provided with a filling material in the form of a right-angled triangle at at least one corner of the cell 221a.

In Patent Literature 1, owing to the cell structure described above, a high aperture ratio is obtained to maintain the pressure loss at a low level while the strength of the porous ceramic member is ensured, thus preventing the occurrence of damage such as cracking.

CITATION LIST

Patent Literature

Patent Literature 1: WO 2007/058006

SUMMARY OF INVENTION

Technical Problem

Gasoline engines are advantageous in that the exhaust gas temperature is high and the emission of PM is small, as compared to diesel engines. Thus, presumably, the PM capturing efficiency of filters for gasoline engines does not have to be as high as that of filters for diesel engines.

On the downside, gasoline engines have poor fuel economy, as compared to diesel engines. Thus, for purification of exhaust gas emitted from gasoline engines, filters for purifying exhaust gas are required to be low-pressure-loss filters. In addition, when the filter temperature is excessively high, the mechanical strength is reduced and the filters become easily breakable. Thus, the filters need to have sufficient heat capacity to prevent an excessive increase in the filter temperature.

When the honeycomb structured body disclosed in Patent Literature 1 is used in an environment as in a gasoline engine in which the exhaust gas temperature is high and the emission of PM is small, it is difficult to sufficiently reduce the pressure loss in the initial state where PM has not accumulated. The initial pressure loss may be reduced by making the cell partition walls thinner; however, when the cell partition walls are made thinner, the heat capacity is small, and the temperature of the porous ceramic member (honeycomb fired body) is likely to be higher than required when exhaust gas flows thereinto. When the temperature of the porous ceramic member (honeycomb fired body) is higher than required, the porous ceramic member (honeycomb fired body) may be broken by its own heat or the catalyst carried thereon may be deactivated. In addition, when the cell partition walls are made thinner, the porous ceramic member (honeycomb fired body) presumably has a lower strength and becomes easily breakable.

In other words, the honeycomb structured body disclosed in Patent Literature 1 is not considered to have sufficient properties as a honeycomb filter for gasoline engines.

The present invention was made in view of the above problems. An object of the present invention is to provide a honeycomb fired body in which the pressure loss in the initial state where PM has not accumulated is sufficiently low, the strength is sufficiently high, and the heat capacity is not small; a honeycomb filter including the honeycomb fired body; and a method for producing the honeycomb fired body.

Solution to Problem

To solve the above problems, the present inventors repeated intensive studies. As a result, they found that when the cell partition walls are made thinner and peripheral cells located at an outermost peripheral region of a honeycomb fired body are formed in a predetermined shape, it is possible to provide a honeycomb fired body in which the pressure loss in the initial state where PM has not accumulated can be made sufficiently low, the strength can be made sufficiently high, and the heat capacity is not small. Thus, the present invention was completed.

Specifically, the honeycomb fired body of the present invention is a honeycomb fired body including a plurality of cells in each of which one end is plugged and which serve as channels of exhaust gas, and porous cell partition walls defining the cells, wherein the honeycomb fired body is formed of SiC, the plurality of cells include peripheral cells located at an outermost peripheral region of the honeycomb fired body and inner cells located more inward than the peripheral cells, all the inner cells have the same cross-sectional shape that is a rectangle in a plane perpendicular to the longitudinal direction thereof, each peripheral cell is defined by the cell partition walls and an outer wall forming a periphery of the honeycomb fired body, the cell partition walls in contact with the outer wall each have a thick wall region where the wall thickness gradually increases toward the outer wall, the cross-sectional shape of the peripheral cells in a plane perpendicular to the longitudinal direction thereof is a shape formed by reducing the rectangular cross-sectional shape of the inner cells to obtain a reduced rectangle and chamfering or rounding two corners of the reduced rectangle, the cross-sectional area of each peripheral cell in a plane perpendicular to the longitudinal direction thereof is 60 to 80% of the cross-sectional area of each inner cell in a plane perpendicular to the longitudinal direction thereof, the cell partition walls include inter-peripheral-cell cell partition walls each located between the peripheral cells and inter-inner-cell cell partition walls each located between the inner cells, and the minimum thickness of the inter-peripheral-cell cell partition walls is greater than the thickness of the inter-inner-cell cell partition walls.

The honeycomb fired body of the present invention is formed of SiC. SiC is a material having excellent heat resistance. Thus, the honeycomb fired body of the present invention has excellent heat resistance.

In the honeycomb fired body of the present invention, all the inner cells have the same cross-sectional shape that is a rectangle in a plane perpendicular to the longitudinal direction thereof, and the cell partition walls in contact with the outer wall each have a thick wall region where the wall thickness gradually increases toward the outer wall, the cross-sectional shape of the peripheral cells in a plane perpendicular to the longitudinal direction thereof is formed by reducing the rectangular cross-sectional shape of the inner cells to obtain a reduced rectangle and chamfering or rounding two corners of the reduced rectangle.

The outer wall of the honeycomb fired body has an increased volume because of the peripheral cells having a cross-sectional shape as described above in a plane perpendicular to the longitudinal direction thereof.

Thus, the honeycomb fired body is sufficiently strong against external shock or the like due to the sufficiently large volume of the outer wall. In addition, since the volume of the outer wall of the honeycomb fired body is large, the heat capacity is not small in the honeycomb fired body of the present invention. Thus, even if the honeycomb fired body of the present invention is heated rapidly, the outer wall can absorb heat and suppress cracks.

The above can also be explained as follows.

The honeycomb fired body is cut out in a predetermined range from a region containing a portion where SiC of the honeycomb fired body is present and a spatial portion where no SiC is present, and the weight of the honeycomb fired body in the predetermined range is divided by the volume of the honeycomb fired body in the predetermined range to determine the "apparent density". In the honeycomb fired body of the present invention, the outermost peripheral region of the honeycomb fired body has a higher apparent density than the inner portion of the honeycomb fired body.

Thus, in the honeycomb fired body of the present invention, the heat capacity of the outermost peripheral region of the honeycomb fired body is relatively large. Therefore, the outermost peripheral region can absorb heat even if heat is applied rapidly to the honeycomb fired body from the outside and thus can prevent cracks.

In addition, when the "apparent density" of the outermost peripheral region of the honeycomb fired body is high, the outer frame is mechanically robust. Thus, the honeycomb fired body is thus sufficiently strong against external shock or the like.

As used herein, the expression "shape formed by chamfering or rounding corners of the rectangle" refers to a shape formed by linearly chamfering or rounding one or more corners of a rectangle.

In the honeycomb fired body of the present invention, the cross-sectional area of each peripheral cell in a plane perpendicular to the longitudinal direction thereof is 60 to 80% of the cross-sectional area of each inner cell in a plane perpendicular to the longitudinal direction thereof.

Usually, it is presumed that the pressure loss increases with a decrease in the cross-sectional area of the cell in a plane perpendicular to the longitudinal direction thereof. Yet, in the honeycomb fired body having the above structure, the increase in pressure loss is suppressed.

Presumably, this is due to the following mechanism.

Usually, an adhesive layer is provided around the periphery of the honeycomb fired body. Some exhaust gas will collide with the adhesive layer upon flowing into the honeycomb fired body. Such exhaust gas will be deflected in its flow by the adhesive layer and flow into a nearby cell. Presumably, such exhaust gas whose flow is deflected flows less into the peripheral cells located at the outermost peripheral region of the honeycomb fired body and flows more into cells located more inward than the peripheral cells. In other words, since exhaust gas is less likely to flow into the peripheral cells located at the periphery of the honeycomb fired body to begin with, the pressure loss is presumably not much affected even if the peripheral cells located at the periphery of the honeycomb fired body each have a moderately small cross-sectional area in a plane perpendicular to the longitudinal direction thereof.

Based on the above reasons, the gas passage resistance is hardly affected even if the cross-sectional area of each peripheral cell in a plane perpendicular to the longitudinal direction thereof is 60 to 80% of the cross-sectional area of each inner cell in a plane perpendicular to the longitudinal direction thereof as in the case of the honeycomb fired body of the present invention. Thus, the pressure loss is presumed to be less likely to increase.

In addition, when the percentage of the above area is less than 60%, the area of the opening of the peripheral cells is small and the channel for exhaust gas is narrow, increasing the gas passage resistance upon passage of exhaust gas through the cell partition walls, resulting in an increased pressure loss.

In addition, when the percentage of the above area is more than 80%, the outermost peripheral region of the honeycomb fired body has a low apparent density, making it difficult to obtain the effect attributable to the thick outer wall of the honeycomb fired body.

In the honeycomb fired body of the present invention, the cell partition walls include inter-peripheral-cell cell partition walls each located between the peripheral cells and inter-inner-cell cell partition walls each located between the inner cells, and the minimum thickness of the inter-peripheral-cell cell partition walls is greater than the thickness of the inter-inner-cell cell partition walls.

With the above structure, the outermost peripheral region of the honeycomb fired body has a high apparent density so that the outer frame is mechanically robust. Thus, the honeycomb fired body is sufficiently strong against external shock or the like. In addition, since the apparent density of the outermost peripheral region of the honeycomb fired body is high, the heat capacity is not small.

In the honeycomb fired body of the present invention, the minimum thickness of the inter-peripheral-cell cell partition walls is preferably 0.100 to 0.300 mm.

The inter-peripheral-cell cell partition walls having a minimum thickness of less than 0.100 mm are so thin that the inter-peripheral-cell cell partition walls are easily breakable.

The inter-peripheral-cell cell partition walls having a minimum thickness of more than 0.300 mm are so thick that the resistance upon passage of exhaust gas through the inter-peripheral-cell cell partition walls is high, resulting in an increased pressure loss.

In the honeycomb fired body of the present invention, the thickness of the inter-inner-cell cell partition walls is preferably 0.210 mm or less.

The inter-inner-cell cell partition walls having a thickness of 0.210 mm or less are sufficiently thin so that the pressure loss in the initial state where PM has not accumulated is sufficiently low. The increase in pressure loss after the accumulation of PM can also be suppressed.

The inter-inner-cell cell partition walls having a thickness of more than 0.210 mm are so thick that the resistance upon passage of exhaust gas through the inter-inner-cell cell partition walls is high, resulting in an increased pressure loss.

In the honeycomb fired body of the present invention, the minimum thickness of the outer wall is preferably 1.5 to 3 times the thickness of the inter-inner-cell cell partition walls.

The outer wall whose minimum thickness is 1.5 to 3 times the thickness of the inter-inner-cell cell partition walls is sufficiently thick and the honeycomb fired body having above structure is thus sufficiently strong against external shock or the like.

The honeycomb filter of the present invention is formed by combining a plurality of the honeycomb fired bodies of the present invention with one another with an adhesive layer therebetween.

The honeycomb filter of the present invention includes the honeycomb fired bodies of the present invention providing the above effects. Thus, in the honeycomb filter of the present invention, the pressure loss in the initial state where PM has not accumulated is sufficiently low, the strength is sufficiently high, and the heat capacity is not small.

The honeycomb filter of the present invention is preferably used to purify exhaust gas from gasoline engines.

As described above, in the honeycomb filter of the present invention, the pressure loss in the initial state where PM has not accumulated is sufficiently low, the strength is sufficiently high, and the heat capacity is not small. Thus, the honeycomb filter of the present invention can be suitably used to purify exhaust gas from gasoline engines.

A method for producing the honeycomb fired body of the present invention includes the steps of extruding a ceramic raw material from an extrusion die to produce a honeycomb molded body having cell partition walls defining cells; plugging one end of each cell; and firing the honeycomb molded body, wherein the extrusion die for use in the extruding includes a first face, a second face formed opposite to the first face, a ceramic raw material supply section having first through holes extending from the first face to the second face, and a molding section having second through holes extending from the second face to the first face to communicate with the first through holes, the second through holes viewed from the second face form a grid including an outermost peripheral slit for molding an outer wall of the honeycomb molded body, peripheral slits for molding inter-peripheral-cell cell partition walls between peripheral cells located at an outermost peripheral region of the honeycomb molded body, and inner slits for molding inter-inner-cell cell partition walls between inner cells located more inward than the peripheral cells, the second face includes an inner grid for forming the inner slits and a peripheral grid located more outward than the inner slits for forming the peripheral slits, all projections of the inner grid viewed from the second face have the same shape that is a rectangle, projections of the peripheral grid viewed from the second face each have a shape formed by reducing the shape of the projections of the inner grid and chamfering or rounding two corners of the reduced shape and the chamfered or rounded corners are adjacent to the outermost peripheral slit, the area of each projection of the peripheral grid viewed from the second face is 60 to 80% of the area of each projection of the inner grid, and the minimum slit width of the peripheral slits is wider than the slit width of the inner slits.

In the method for producing the honeycomb fired body of the present invention, the use of the extrusion die having the above structure enables the production of the honeycomb fired body of the present invention providing the above effects.

In particular, according to the method for producing the honeycomb fired body of the present invention, defects are less likely to occur in the inter-peripheral-cell cell partition walls due to the following reasons.

Usually, when a ceramic raw material flows into an extrusion die in which the slit width is not constant, the discharge rate of the ceramic raw material is high at a portion where the slit width is wide, and the discharge rate of the ceramic raw material is low at a portion where the slit width is narrow. Such a difference in the discharge rate of the ceramic raw material flowing through the slits causes a breakage of the cell partition walls to be molded because the ceramic raw material at a high discharge rate drags the ceramic raw material at a low discharge rate.

For example, in the case where the honeycomb molded body is produced using an extrusion die in which the peripheral slits are formed in such a manner that their slit width on the inner slit side is equal to the width of the inner slits and that their slit width abruptly widens in the middle toward the outermost peripheral slit, the discharge rate of the ceramic raw material flowing through the wide slit portions of the peripheral slits is so high that the ceramic raw material drags the ceramic raw material flowing through the portions of the peripheral slits where their slit width is equal to the width of the inner slits. Thus, the cell partition walls to be formed are easily breakable.

However, when the minimum slit width of the peripheral slits is wider than the slit width of the inner slits, the difference in the discharge rate between the ceramic raw material flowing into the inner slits and the ceramic raw material flowing into the peripheral slits can be reduced. This can prevent the occurrence of defects in the cell partition walls to be molded.

In the extrusion die for use in the method for producing the honeycomb fired body of the present invention, the minimum slit width of the peripheral slits is preferably 0.100 to 0.300 mm.

When the minimum slit width of the peripheral slits is less than 0.100 mm, a difference easily occurs in the discharge rate of the ceramic raw material, and the inter-peripheral-cell cell partition walls to be molded are susceptible to defects.

When the minimum slit width of the peripheral slit is more than 0.300 mm, the inter-peripheral-cell cell partition walls to be molded are so thick that the resistance upon passage of exhaust gas through the inter-peripheral-cell cell partition walls of the produced honeycomb fired body is high, resulting in an increased pressure loss.

In the extrusion die for use in the method for producing the honeycomb fired body of the present invention, the slit width of the inner slits is preferably 0.210 mm or less.

The use of such an extrusion die enables the production of a honeycomb fired body in which the thickness of the inter-inner-cell cell partition walls is 0.210 mm or less.

Since the cell partition walls of the produced honeycomb fired body are sufficiently thin, the pressure loss in the initial state where PM has not accumulated is sufficiently low. The increase in pressure loss after the accumulation of PM can also be suppressed.

The extrusion die in which the slit width of the inner slits is more than 0.210 mm produces a honeycomb fired body in which the thickness of the inter-inner-cell cell partition walls is more than 0.210 mm. In such a honeycomb fired body, the inter-inner-cell cell partition walls are so thick that the resistance upon passage of exhaust gas through the cell partition walls is high, resulting in an increased pressure loss.

In the extrusion die for use in the method for producing the honeycomb fired body of the present invention, the minimum slit width of the outermost peripheral slit is preferably 1.5 to 3 times the slit width of the inner slits.

The honeycomb fired body produced using such an extrusion die has a sufficiently thick outer wall. Thus, the outer frame is mechanically robust and the honeycomb fired body has sufficiently strong against external shock or the like. In addition, since the outer wall of the honeycomb fired body is thick, the heat capacity is not small.

In the extrusion die for use in the method for producing the honeycomb fired body of the present invention, a raw material flow suppression section is preferably formed on an inner wall surface of the peripheral slits.

In the extrusion die for use in the method for producing the honeycomb fired body of the present invention, the slit width of the inner slits is narrower than the minimum slit width of the peripheral slits. Thus, the discharge rate of the ceramic raw material flowing through the inner slits is lower than the discharge rate of the ceramic raw material flowing through the peripheral slits. Such a difference in the discharge rate of the ceramic raw material causes a breakage of the cell partition walls to be molded because the ceramic raw material at a high discharge rate drags the ceramic raw material at a low discharge rate.

However, when the raw material flow suppression section is formed on the inner wall surface of the peripheral slits of the extrusion die, the raw material flow suppression section creates resistance, suppressing the discharge of the ceramic raw material from the peripheral slits. As a result, the discharge rate of the ceramic raw material to be extruded from the peripheral slits slows down, and the difference in the discharge rate between the ceramic raw material to be extruded from the peripheral slits and the ceramic raw material to be extruded from the inner slits can be reduced. This can prevent the occurrence of defects in the cell partition walls to be molded.

BRIEF DESCRIPTION OF DRAWINGS

FIG. 4 is a schematic view of the causative mechanism by which the increase in pressure loss is suppressed in the honeycomb fired body of the present invention, regardless of the fact that the cross-sectional area of each peripheral cell in a plane perpendicular to the longitudinal direction thereof is smaller than the cross-sectional area of each inner cell in a plane perpendicular to the longitudinal direction thereof.

FIG. 8 is a schematic cross-sectional view of an example of an extrusion die for use in the method for producing the honeycomb fired body of the present invention.

DESCRIPTION OF EMBODIMENTS

Hereinafter, the honeycomb fired body and the honeycomb filter of the present invention and the method for producing the honeycomb fired body of the present invention are specifically described. However, the present invention is not limited to these embodiments, and may be modified without departing from the gist of the present invention.

The honeycomb fired body of the present invention is described with reference to the drawings.

Figure 1A:
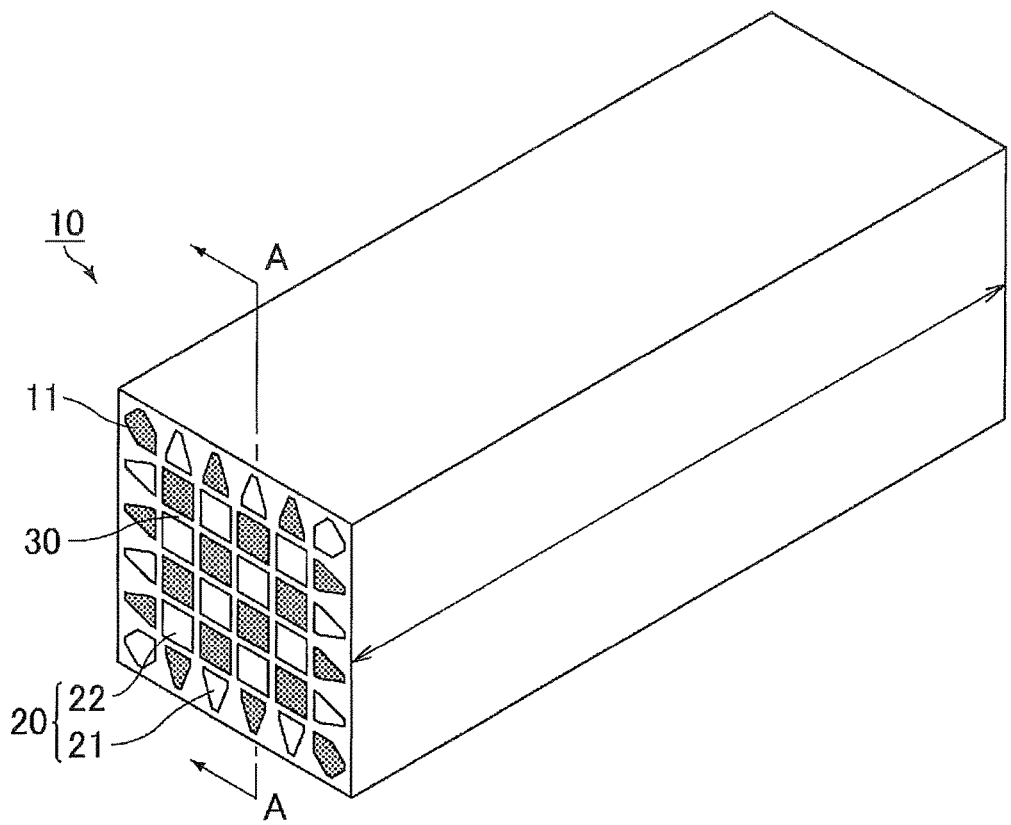
FIG. 1(a) is a schematic perspective view of an example of a honeycomb fired body of the present invention.
Figure 1B:
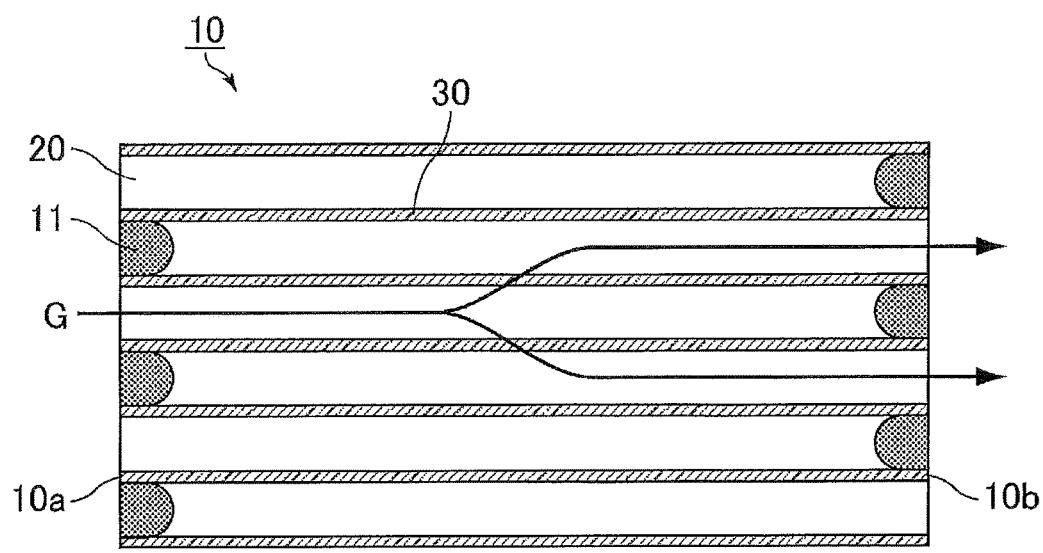
FIG. 1(b) is a cross-sectional view of FIG. 1(a) taken along line A-A.

FIG. 1(a) is a schematic perspective view of an example of the honeycomb fired body of the present invention. FIG. 1(b) is a cross-sectional view of FIG. 1(a) taken along line A-A.

As shown in FIG. 1(a), a honeycomb fired body 10 as an example of the honeycomb fired body of the present invention includes a plurality of cells 20 in each of which one end is plugged with a plug 11 and which serve as channels of exhaust gas, and porous cell partition walls 30 defining the cells.

The cells 20 include peripheral cells 21 located at an outermost peripheral region of the honeycomb fired body, and inner cells 22 located more inward than the peripheral cells 21.

All the inner cells 22 have the same cross-sectional shape that is a rectangle in a plane perpendicular to the longitudinal direction thereof, and the cross-sectional shape of the peripheral cells 21 in a plane perpendicular to the longitudinal direction thereof is a shape formed by chamfering or rounding two corners of the rectangular cross-sectional shape of the inner cells 22. The cross-sectional shapes of the peripheral cells 21 and the inner cells 22 are described later in detail.

As shown in FIGS. 1(a) and 1(b), the honeycomb fired body 10 is a rectangular parallelepiped whose cross section is a square in a plane perpendicular to the longitudinal direction (in the direction indicated by a double-headed arrow shown in FIG. 1(a)).

The cross section of the honeycomb fired body 10 in a plane perpendicular to the longitudinal direction thereof is preferably a square with a side length of 30 to 45 mm.

The entire length of the honeycomb fired body 10 is preferably 140 to 160 mm.

The honeycomb fired body 10 is formed of SiC. SiC is a material having excellent heat resistance. Thus, the honeycomb fired body 10 has excellent heat resistance.

In the honeycomb fired body 10, the cell density is preferably in the range of 15.5 to 62 pcs/cm$^2$ (100 to 400 cpsi), more preferably 31 to 46.5 pcs/cm$^2$ (200 to 300 cpsi).

The passage of exhaust gas through the honeycomb fired body 10 having the above structure is described below with reference to FIG. 1(b).

As shown in FIG. 1(b), exhaust gas emitted from an internal combustion engine flows into the honeycomb fired body 10 (in FIG. 1(b), exhaust gas is indicated by G, and the flow of the exhaust gas is indicated by arrows) and enters the cells 20 of the honeycomb fired body 10 in each of which is open at an exhaust gas inlet side end face 10a, and passes through cell partition walls 30 separating the cells 20 from each other. At this point, PM in exhaust gas is captured by the cell partition walls 30, and the exhaust gas is purified. The purified exhaust gas flows out from other cells 20 in each of which is open at an exhaust gas outlet side end face 10b, and is emitted to the outside.

Next, details such as the arrangement of the cells 20 in the honeycomb fired body 10 and the shape of the cell partition walls 30 are described with reference to the drawings.

Figure 2:
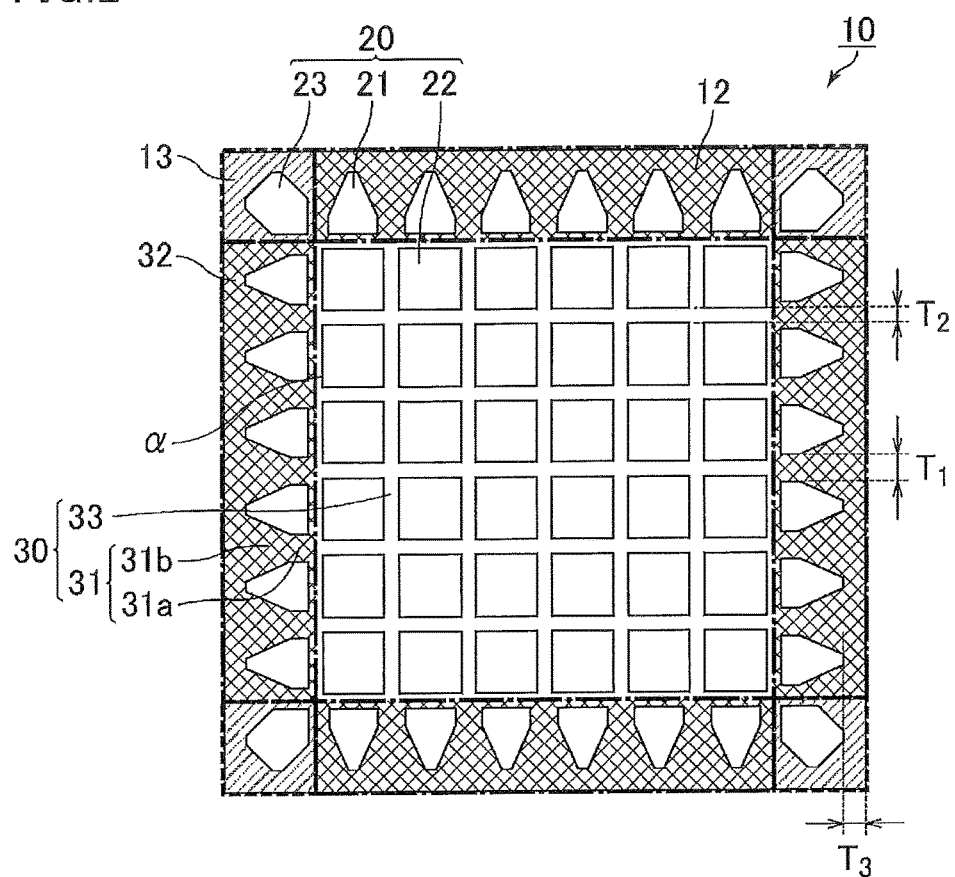
FIG. 2 is a schematic cross-sectional view of an example of the cross section of the honeycomb fired body of the present invention shown in FIG. 1 in a plane perpendicular to the longitudinal direction thereof.

FIG. 2 is a schematic cross-sectional view of an example of the cross section of the honeycomb fired body of the present invention shown in FIG. 1 in a plane perpendicular to the longitudinal direction thereof.

As shown in FIG. 2, the cells 20 include the peripheral cells 21 located at an outermost peripheral region 12 of the honeycomb fired body 10 and the inner cells 22 located more inward than the peripheral cells 21. The cells 20 also include corner cells 23 located at corners 13 of the honeycomb fired body 10.

As used herein, "the corners of the honeycomb fired body" are excluded from "the outermost peripheral region of the honeycomb fired body". In other words, the peripheral cells 21 do not include the corner cells 23.

The inner cells 22 are defined by the cell partition walls 30, and the peripheral cells 21 are defined by the cell partition walls 30 and an outer wall 32 forming the periphery of the honeycomb fired body 10.

As shown in FIG. 2, in the honeycomb fired body 10, the cell partition walls 30 include inter-peripheral-cell cell partition walls 31 each located between the peripheral cells 21 and inter-inner-cell cell partition walls 33 each located between the inner cells 22. Each inter-peripheral-cell cell partition wall 31 has a constant width region 31a where the gap between the cells is constant and a thick wall region 31b where the wall thickness gradually increases toward the outer wall 32. The constant width regions 31a are in contact with the inter-inner-cell cell partition walls 33, and the thick wall regions 31b are in contact with the outer wall 32. A thickness $T_2$ of the inter-inner-cell cell partition walls 33 is constant.

A minimum thickness $T_1$ of the inter-peripheral-cell cell partition walls 31 (i.e., the width of the constant width region 31a) is greater than the thickness $T_2$ of the inter-inner-cell cell partition walls 33.

With the above structure, the apparent density of the outermost peripheral region 12 of the honeycomb fired body 10 is high so that the outer frame is mechanically robust. Thus, the honeycomb fired body 10 is sufficiently strong against external shock or the like. In addition, since the apparent density of the outermost peripheral region 12 of the honeycomb fired body 10 is high, the heat capacity is not small.

The minimum thickness $T_1$ of the inter-peripheral-cell cell partition walls 31 is preferably 1.5 to 3 times the thickness $T_2$ of the inter-inner-cell cell partition walls 33.

In the honeycomb fired body 10, the minimum thickness $T_1$ of the inter-peripheral-cell cell partition walls 31 is preferably 0.100 to 0.300 mm.

The inter-peripheral-cell cell partition walls 31 having a minimum thickness $T_1$ of less than 0.100 mm are so thin that the inter-peripheral-cell cell partition walls 31 are easily breakable.

The inter-peripheral-cell cell partition walls 31 having a minimum thickness $T_1$ of more than 0.300 mm are so thick that the resistance upon passage of exhaust gas through the inter-peripheral-cell cell partition walls 31 is high, resulting in an increased pressure loss.

In the honeycomb fired body 10, the thickness $T_2$ of the inter-inner-cell cell partition walls 33 is preferably 0.210 mm or less, more preferably 0.075 to 0.160 mm.

The inter-inner-cell cell partition walls 33 having a thickness $T_2$ of 0.210 mm or less are sufficiently thin so that the pressure loss in the initial state where PM has not accumulated is sufficiently low. The increase in pressure loss after the accumulation of PM can also be suppressed.

The inter-inner-cell cell partition walls 33 having a thickness $T_2$ of more than 0.210 mm are so thick that the resistance upon passage of exhaust gas through the inter-inner-cell cell partition walls 33 is high, resulting in an increased pressure loss.

In the honeycomb fired body 10, the thickness of the outer wall 32 is not particularly limited, but a minimum thickness $T_3$ of the outer wall 32 is preferably 1.5 to 3 times, more preferably 2 to 3 times the thickness $T_2$ of the inter-inner-cell cell partition walls 33. For example, the minimum thickness $T_3$ of the outer wall 32 is preferably 0.113 to 0.480 mm.

The outer wall 32 whose minimum thickness $T_3$ is 1.5 to 3 times the thickness $T_2$ of the inter-inner-cell cell partition walls 33 is sufficiently thick, and the honeycomb fired body 10 is thus sufficiently strong against external shock or the like.

In the honeycomb fired body 10, the porosity of the cell partition walls 30 is preferably 40 to 65%.

The cell partition walls 30 having a porosity of 40 to 65% can successfully capture PM in exhaust gas, and the increase in pressure loss attributable to the cell partition walls 30 can be suppressed. Thus, the honeycomb fired body 10 in which the initial pressure loss is low and the increase in pressure loss is suppressed even after the accumulation of PM can be provided.

When the porosity of the cell partition walls 30 is less than 40%, the percentage of pores in the cell partition walls 30 is so low that exhaust gas cannot easily pass through the cell partition walls 30, resulting in an increased pressure loss upon passage of exhaust gas through the cell partition walls 30. In contrast, the cell partition walls 30 having a porosity of more than 65% have a low mechanical strength, and cracks are easily formed during regeneration or the like.

In the honeycomb fired body 10, the average pore diameter of pores in the cell partition walls 30 is preferably 8 to 25 μm.

The honeycomb fired body 10 having the above structure can capture PM with high capturing efficiency while the increase in pressure loss is suppressed.

When the average pore diameter of pores in the cell partition walls 30 is less than 8 μm, the pores are so small that the pressure loss upon passage of exhaust gas through the cell partition walls 30 is high. In contrast, when the average pore diameter of pores in the cell partition walls 30 is more than 25 μm, the pore diameter is so large that the PM capturing efficiency is reduced.

The porosity and the average pore diameter can be determined by mercury porosimetry.

In the honeycomb fired body 10, the porosity of the outer wall 32 is preferably 40 to 65%.

The porosity of the outer wall 32 is preferably in the above range for the same reason as to why the porosity of the cell partition walls 30 is preferably in the above range.

In the honeycomb fired body 10, the average pore diameter of pores in the outer wall 32 is preferably 8 to 25 μm.

The average pore diameter of pores in the outer wall 32 is preferably in the above range for the same reason as to why the average pore diameter of the pores in the cell partition walls 30 is in the above range.

Next, the shape of the cells 20 of the honeycomb fired body 10 is described.

First, all the inner cells 22 have the same cross-sectional shape that is a rectangle a in a plane perpendicular to the longitudinal direction thereof.

In the honeycomb fired body 10, the rectangle α is preferably a square and is more preferably a square with a side length of 0.5 to 2.0 mm.

The cross-sectional shape of the peripheral cells 21 in a plane perpendicular to the longitudinal direction thereof is formed by reducing the rectangle a that is the cross-sectional shape of the inner cells 22 and chamfering or rounding two corners of the reduced rectangle α'.

In addition, the inter-peripheral-cell cell partition walls 31 in contact with the outer wall 32 each have the thick wall region 31b where the wall thickness gradually increases toward the outer wall 32.

Specifically, in the cross-sectional shape of the peripheral cells 21 in a plane perpendicular to the longitudinal direction thereof, a portion between the chamfered or rounded corners of the adjacent rectangles α' is the thick wall region 31b.

The expression "shape formed by chamfering or rounding corners of the rectangle" refers to a shape that is a rectangle whose corners are linearly chamfered or rounded.

The rectangle α' may be a shape formed by reducing the rectangle α at the same scale or a shape formed by reducing the rectangle α lengthwise or widthwise. In this case, the area of the rectangle α' is preferably 60 to 80% of the area of the rectangle α.

Alternatively, the cross-sectional shape of the peripheral cells 21 may be any of the shapes shown in FIGS. 3(a) to 3(e).

FIGS. 3(a) to 3(e) are each a schematic cross-sectional view of an example of the cross-sectional shape of the peripheral cell of the honeycomb fired body of the present invention in a plane perpendicular to the longitudinal direction thereof.

Figure 3A:
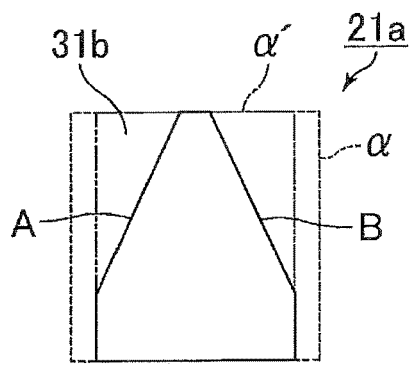
FIGS. 3(a) to 3(e) are each a schematic cross-sectional view of an example of the cross-sectional shape of a peripheral cell of the honeycomb fired body of the present invention in a plane perpendicular to the longitudinal direction thereof.

FIG. 3(a) shows the cross-sectional shape of a hexagonal peripheral cell 21a. In this case, the rectangle a is reduced to a rectangle α' whose width is 0.8 times that of the rectangle α, and two adjacent corners of the rectangle α' are cut by two segments A and B, respectively. The segments A and B are not in direct contact with each other. The segments A and B cross each other outside the rectangle α' when extended. A line between the two cut-out corners, which is a portion forming one side of the rectangle α', forms one side of the hexagon.

Figure 3B:
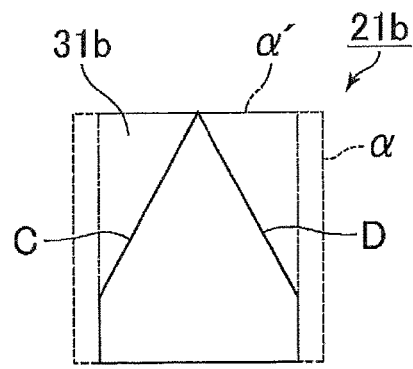

FIG. 3(b) shows the cross-sectional shape of a pentagonal peripheral cell 21b. In this case, two adjacent corners of the rectangle α' are cut by two segments C and D, respectively. The segment C and the segment D are in contact with each other on one side of the rectangle α'. The segment C and the segment D may cross each other inside the rectangle α'. In other words, there is no line as a side of the pentagon between the two cut-out corners.

Figure 3C:
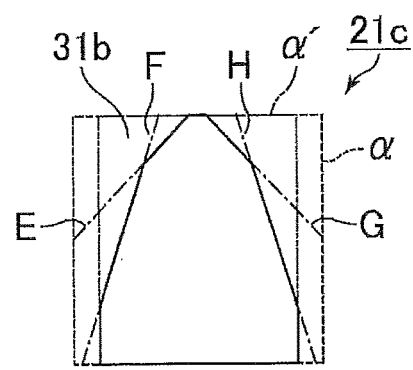

FIG. 3(c) shows the cross-sectional shape of an octagonal peripheral cell 21c. In this case, one of two adjacent corners of the rectangle α' is cut by segments E and F, and the other corner is cut by segments G and H. The segment E and the segment F cross each other inside the rectangle α'. The segment G and the segment H also cross each other inside the rectangle α'. A line between the two cut-out corners, which is a portion forming one side of the rectangle α', forms one side of the octagon.

Figure 3D:
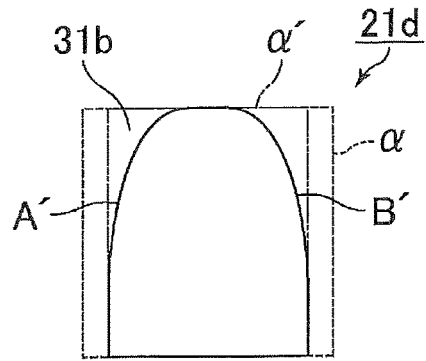

FIG. 3(d) shows the cross-sectional shape of a peripheral cell 21d. In this case, two adjacent corners of the rectangle α' are cut by two curves A' and B', respectively. The curves A' and B' are formed by bending the segments A and B in such a manner that the corners of the rectangle α' are rounded. A line between the two cut-out corners, which is a portion forming one side of the rectangle α', forms a portion of the contour of the cross-sectional shape of the peripheral cell 21d.

Figure 3E:
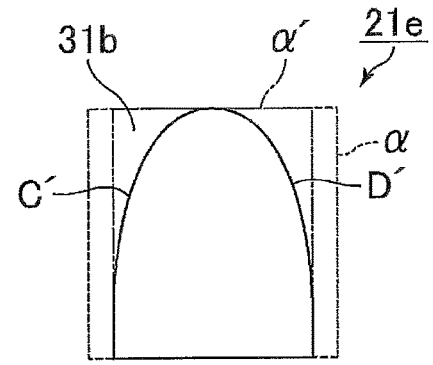

FIG. 3(e) shows the cross-sectional shape of a peripheral cell 21e. In this case, two adjacent corners of the rectangle α' are cut by two curves C' and D', respectively. The curves C' and D' are formed by bending the segments C and D in such a manner that the corners of the rectangle α' are rounded. The curve C' and the curve D' are in contact with each other on one side of the rectangle α'. The curve C' and the curve D' may cross each other inside the rectangle α'.

In the honeycomb fired body 10, the thick wall regions 31b are formed at the portions where the corners of the rectangle α' is cut out in FIGS. 3(a) to 3(e) (i.e., the portions surrounded by dashed lines and solid lines).

The cross-sectional shape of the peripheral cells 21 is not limited to those described above, and may be a different shape formed by chamfering or rounding two corners of the rectangle α'.

When the cross-sectional shape of the peripheral cells 21 in a plane perpendicular to the longitudinal direction thereof is as described above and the thick wall regions 31b are formed, the volume of the region around the outer wall 32 of the honeycomb fired body 10 is large.

Since the volume of the region around the outer wall 32 is sufficiently large, the honeycomb fired body 10 is sufficiently strong against external shock or the like. In addition, since the volume of the region around the outer wall 32 is large, the heat capacity is not small in the honeycomb fired body 10. Thus, even if the honeycomb fired body 10 is heated rapidly, the outer wall 32 can absorb heat and suppress cracks.

The above can also be explained as follows.

The honeycomb fired body 10 is cut out in a predetermined range from a region containing a portion where SiC is present and a spatial portion where no SiC is present in the honeycomb fired body 10, and the weight of the honeycomb fired body 10 in the predetermined range is divided by the volume of the honeycomb fired body 10 in the predetermined range to determine the "apparent density". In the honeycomb fired body 10, the outermost peripheral region 12 of the honeycomb fired body 10 has a higher apparent density than the inner portion of the honeycomb fired body 10.

Thus, in the honeycomb fired body 10, the heat capacity is relatively large in the outermost peripheral region 12 of the honeycomb fired body 10. Therefore, the outermost peripheral region 12 can absorb heat even if heat is applied rapidly to the honeycomb fired body from the outside and thus can prevent cracks.

In addition, when the "apparent density" of the outermost peripheral region 12 of the honeycomb fired body 10 is high, the outer frame is mechanically robust. Thus, the honeycomb fired body 10 is thus sufficiently strong against external shock or the like.

In the honeycomb fired body 10, the cross-sectional area of each peripheral cell 21 in a plane perpendicular to the longitudinal direction thereof is 60 to 80% of the cross-sectional area of each inner cell 22 in a plane perpendicular to the longitudinal direction thereof.

Usually, it is presumed that the pressure loss increases with a decrease in the cross-sectional area of the cell in a plane perpendicular to the longitudinal direction thereof. Yet, in the honeycomb fired body 10 having the above structure, the increase in pressure loss is suppressed.

The factors thereof are as described below with reference to the drawings.

FIG. 4 is a schematic view of the causative mechanism by which the increase in pressure loss is suppressed in the honeycomb fired body of the present invention, regardless of the fact that the cross-sectional area of each peripheral cell in a plane perpendicular to the longitudinal direction thereof is smaller than the cross-sectional area of each inner cell in a plane perpendicular to the longitudinal direction thereof.

As shown in FIG. 4, usually, an adhesive layer 14 is provided around the periphery of the honeycomb fired body 10. Some exhaust gas will collide with the adhesive layer 14 upon flowing into the honeycomb fired body 10. Such exhaust gas is stopped by the adhesive layer 14 and moves in a direction substantially perpendicular to the flow (in FIG. 4, exhaust gas is indicated by G, and the flow of the exhaust gas is indicated by arrows). The exhaust gas whose flow direction is changed as described above is pushed by another flow of exhaust gas and flows into the peripheral cells 21 located at the outermost peripheral region 12 of the honeycomb fired body 10 or the inner cells 22 located more inward than the peripheral cells 21. Since the exhaust gas whose flow direction is changed has a certain degree of momentum, a large amount of the exhaust gas flows over the peripheral cells 21 and flows into the inner cells 22. Thus, it is presumed that more exhaust gas flows into the inner cells 22 than into the peripheral cells 21. In other words, since exhaust gas is less likely to flow into the peripheral cells 21 located at the outermost peripheral region 12 of the honeycomb fired body 10 to begin with, the pressure loss is presumably not much affected even if the peripheral cells 21 located at the outermost peripheral region 12 of the honeycomb fired body 10 each have a moderately small cross-sectional area in a plane perpendicular to the longitudinal direction thereof.

Consequently, the gas passage resistance is hardly affected even if the cross-sectional area of each peripheral cell 21 in a plane perpendicular to the longitudinal direction thereof is 60 to 80% of the cross-sectional area of each inner cell 22 in a plane perpendicular to the longitudinal direction thereof as in the case of the honeycomb fired body 10. Thus, the pressure loss is presumed to be less likely to increase.

In addition, when the percentage of the above area is less than 60%, the area of the opening of the peripheral cells 21 is small and the channel for exhaust gas is narrow, increasing the gas passage resistance upon passage of exhaust gas through the cell partition walls 30, resulting in an increased pressure loss.

In addition, when the percentage of the above area is more than 80%, the outermost peripheral region of the honeycomb fired body 10 has a low apparent density, making it difficult to obtain the effect attributable to the thick outer wall 32 of the honeycomb fired body 10.

The following method can be used to determine the cross-sectional area of each peripheral cell 21 in a plane perpendicular to the longitudinal direction thereof and the cross-sectional area of each inner cell 22 in a plane perpendicular to the longitudinal direction thereof.

First, the honeycomb fired body 10 is cut in a plane perpendicular to the longitudinal direction thereof. Next, an SEM image of the cross section of the honeycomb fired body 10 in a plane perpendicular to the longitudinal direction thereof is taken.

The SEM image taken is binarized to identify framework portions such as the cell partition walls 30 and the outer wall 32 and spatial portions such as the peripheral cells 21 and the inner cells 22. The area of a portion identified as a spatial portion of each cell in the SEM image is regarded as the area of each cell.

The cross-sectional area of each inner cell 22 in a plane perpendicular to the longitudinal direction thereof is an average cross-sectional area of all the inner cells 22 in a plane perpendicular to the longitudinal direction thereof, which is determined by the above method.

Next, the shape of the corner cells 23 located at the corners 13 of the honeycomb fired body 10 is described.

The cross-sectional shape of the corner cells 23 in a plane perpendicular to the longitudinal direction thereof is not particularly limited, but it is preferably a shape formed by chamfering or rounding at least one corner of the rectangle α that is the cross-sectional shape of the inner cells 22. Alternatively, it may be a shape formed by reducing the rectangle α and chamfering or rounding at least one corner of the reduced rectangle α'. When the shape of the corner cells 23 is as described above, the volume of the region around the outer wall 32 of the honeycomb fired body 10 is large.

Since the volume of the region around the outer wall 32 is sufficiently large, the honeycomb fired body 10 is sufficiently strong against external shock or the like. In addition, since the volume of the region around the outer wall 32 is large, the heat capacity is not small in the honeycomb fired body 10. Thus, even if the honeycomb fired body 10 is heated rapidly, the outer wall 32 can absorb heat and suppress cracks.

In addition, the shape of the corner cells 23 may be a shape formed by linearly chamfering or rounding all the corners of the rectangle α or the rectangle α' or a shape similar to the shape of the peripheral cells 21. Alternatively, the shape may be any of the shapes shown in FIGS. 5(*a*) to 5(*d*).

FIGS. 5(*a*) to 5(*d*) are each a schematic cross-sectional view of an example of the cross-sectional shape of a corner cell in a plane perpendicular to the longitudinal direction thereof in the honeycomb fired body of the present invention.

FIG. 5(*a*) shows the cross-sectional shape of a heptagonal corner cell 23*a*. In this case, among the corners of the rectangle α, except for one corner located most inward of the honeycomb fired body 10, three corners are cut by three segments I, J, and K, respectively. The segments I and J are not in direct contact with each other. The segments I and J cross each other outside the rectangle α when extended. Also, the segments I and K are not in direct contact with each other. The segments I and K cross each other outside the rectangle α when extended. The segment J and the segment K are parallel to each other. Lines between the three cut-out corners, which are portions forming the sides of the rectangle α, form the sides of the heptagon that is the cross-sectional shape of the corner cells 23*a*.

FIG. 5(*b*) shows the cross-sectional shape of a pentagonal corner cell 23*b*. In this case, among the corners of the rectangle α, one corner located most inward of the honeycomb fired body 10 is cut by a segment L.

FIG. 5(*c*) shows the cross-sectional shape of a corner cell 23*c*. In this case, among the corners of the rectangle α, except for one corner located most inward of the honeycomb fired body 10, three corners are cut by three curves I', J', and K', respectively. The curves I', J', and K' are formed by bending the segments I, J, and K in such a manner that the corners of the rectangle α are rounded. Lines between the three cut-out corners, which are portions forming the sides of the rectangle α, form portions of the contour of the cross-sectional shape of the corner cells 23*c*.

FIG. 5(*d*) shows the cross-sectional shape of a corner cell 23*d*. In this case, among the corners of the rectangle α, one corner located most inward of the honeycomb fired body 10 is cut by a curve L'. The curve L' is formed by bending the segment L in such a manner that the corner of the rectangle α is rounded.

Particularly, when the shape of the corner cells 23 is as shown in FIG. 5(*b*) or FIG. 5(*d*), the honeycomb fired body 10 is more resistant to compressive stress, owing to its structure. Thus, the honeycomb fired body 10 is sufficiently strong against external shock or the like.

In the honeycomb fired body 10, the cross-sectional area of the corner cells 23 in a plane perpendicular to the longitudinal direction thereof is preferably 60 to 80% of the cross-sectional area of each inner cell 22 in a plane perpendicular to the longitudinal direction thereof.

When the percentage of the above area is less than 60%, the area of the opening of each corner cell 23 is small and the channel for the exhaust gas is narrow, increasing the gas passage resistance upon passage of exhaust gas through the cell partition walls 30, resulting in an increased pressure loss.

When the percentage of the above area is more than 80%, the corners of the honeycomb fired body 10 have a low apparent density due to the large cross-sectional area of each corner cell 23 in a plane perpendicular to the longitudinal direction thereof. Thus, the mechanical strength of the honeycomb fired body 10 tends to be insufficient.

The honeycomb fired body 10 may carry a catalyst for purifying exhaust gas. Preferred examples of catalysts to be carried are noble metals such as platinum, palladium, and rhodium. Platinum is more preferred among these. Examples of other catalysts include alkali metals such as potassium and sodium, and alkaline-earth metals such as barium. These catalysts may be used alone or in combination of two or more thereof.

The presence of these catalysts facilitates removal of PM by combustion and enables purification of toxic exhaust gas.

Next, the honeycomb filter of the present invention is described with reference to the drawings.

Figure 6:
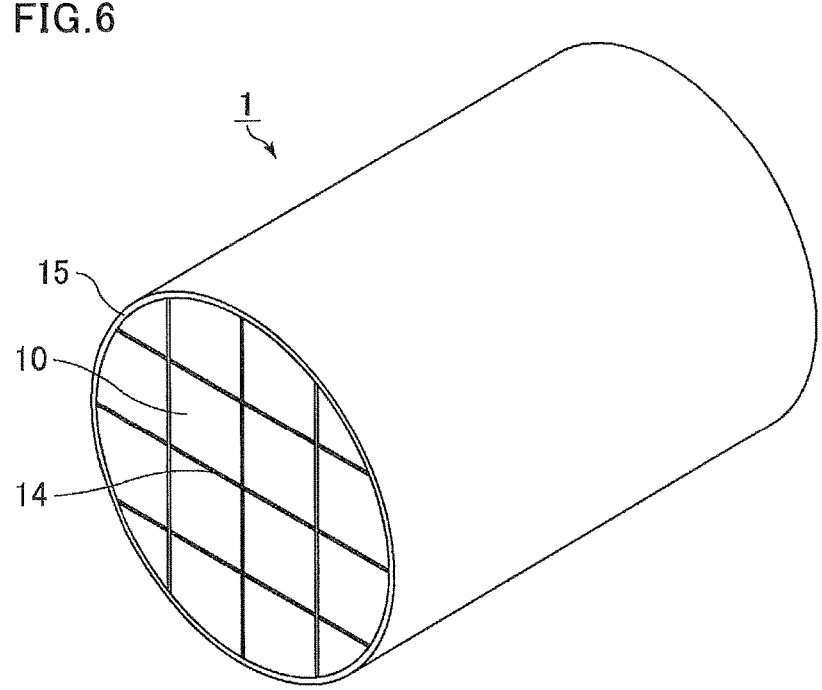
FIG. 6 is a schematic perspective view of an example of the honeycomb filter of the present invention.

FIG. 6 is a schematic perspective view of an example of the honeycomb filter of the present invention.

As shown in FIG. 6, a honeycomb filter 1, which is an example of the honeycomb filter of the present invention, is a round pillar-shaped honeycomb filter formed by combining the honeycomb fired bodies 10 with one another with the adhesive layer 14 therebetween.

The honeycomb filter 1 includes the honeycomb fired bodies 10 providing the above effects. Thus, the pressure loss in the initial state where PM has not accumulated is sufficiently low, the strength is sufficiently high, and the heat capacity is not small.

In the honeycomb filter 1, the adhesive layer 14 is obtained by applying an adhesive paste containing an inorganic binder and inorganic particles and drying the adhesive paste. The adhesive paste may further contain inorganic fibers and/or whiskers.

The honeycomb filter 1 may optionally have a peripheral coat layer 15 formed on the periphery thereof to prevent leakage of exhaust gas. The peripheral coat layer 15 is preferably formed of the same material as that of the adhesive paste.

The honeycomb filter 1 is preferably a honeycomb filter for us in purifying exhaust gas from gasoline engines.

As described above, in the honeycomb filter 1, the pressure loss in the initial state where PM has not accumulated is sufficiently low, the strength is sufficiently high, and the heat capacity is not small. Thus, the honeycomb filter 1 can be suitably used to purify exhaust gas from gasoline engines.

An exhaust gas purification device including the honeycomb filter 1 is described with reference to the drawings.

Figure 7:
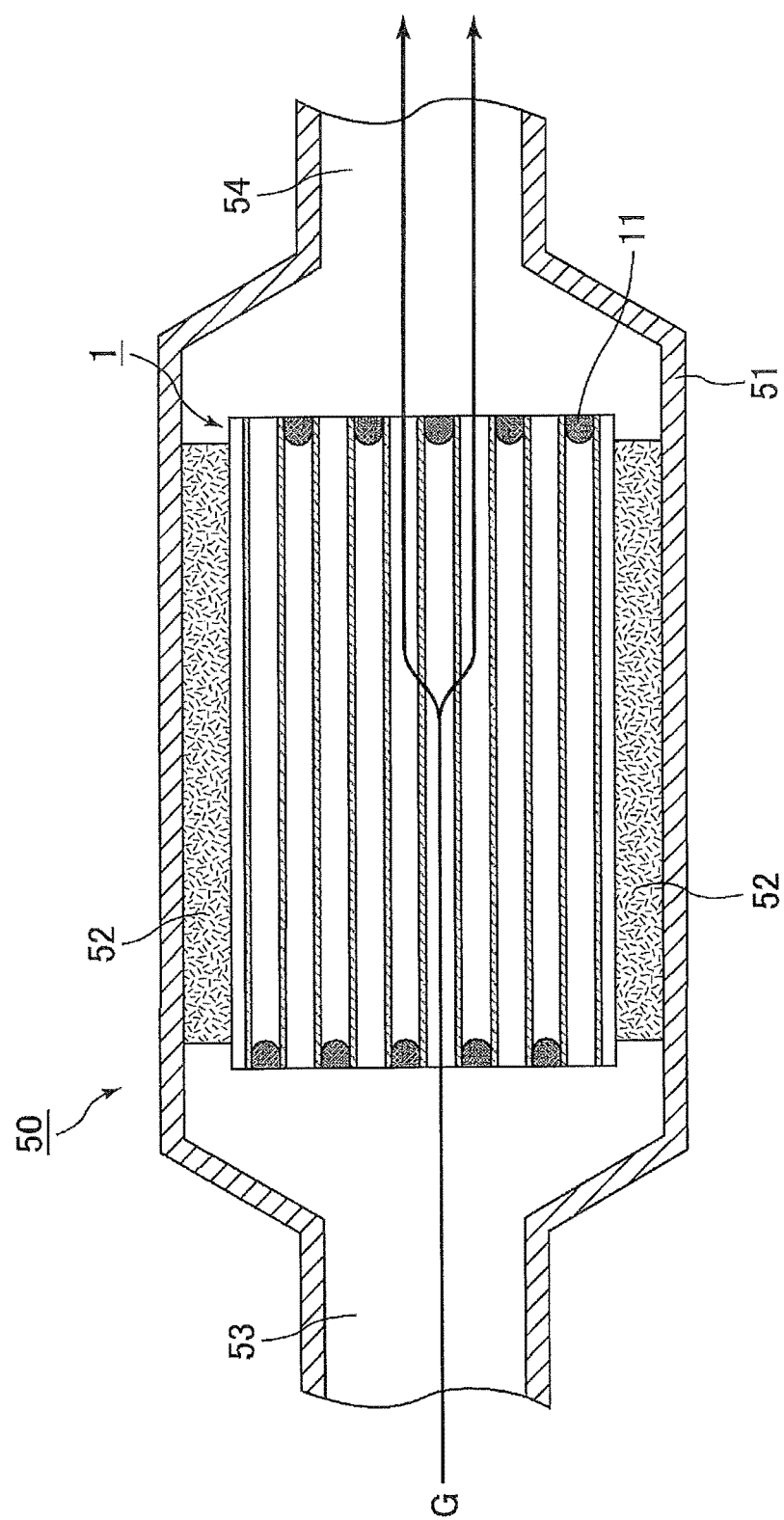
FIG. 7 is a schematic cross-sectional view of an example of an exhaust gas purification device including the honeycomb filter of the present invention therein.

FIG. 7 is a schematic cross-sectional view of an example of an exhaust gas purification device including the honeycomb filter of the present invention therein.

An exhaust gas purification device 50 shown in FIG. 7 includes the honeycomb filter 1, a metal casing 51 that externally covers the honeycomb filter 1, and a holding seal material 52 arranged between the honeycomb filter 1 and the metal casing 51. An inlet tube 53 connected to an internal combustion engine such as an engine is connected to the metal casing 51 at one end where exhaust gas is introduced. An outlet tube 54 connected to the outside is connected to the metal casing 51 at the other end.

Exhaust gas emitted from an internal combustion engine flows into the exhaust gas purification device 50 (in FIG. 7, exhaust gas is indicated by G, and the flow of the exhaust gas is indicated by arrows) and reaches the honeycomb fired body 10 constituting the honeycomb filter 1 and is purified by the honeycomb fired body 10. The mechanism for purification of exhaust gas by the honeycomb fired body 10 is as described above, and thus, the explanation is omitted. Purified exhaust gas flows out of the honeycomb fired body 10 and is emitted to the outside.

In the exhaust gas purification device 50, the holding seal material 52 is preferably a mat made of inorganic fibers. The mat is preferably a needle mat obtained by a needling treatment.

The inorganic fibers may be alumina fibers, alumina-silica fibers, silica fibers, or biosoluble fibers.

The needling treatment is a process in which a fiber entangling means such as a needle is pushed in and out of a base mat. In the holding seal material 52, preferably, inorganic fibers having a relatively long average fiber length are three-dimensionally entangled with each other by the needling treatment.

The average fiber length of inorganic fibers is long to a certain extent, for example, preferably about 50 μm to 100 mm, to form the entanglement structure.

The average fiber diameter of inorganic fibers of the mat to form the holding seal material 52 is preferably 1 to 20 μm, more preferably 3 to 10 μm.

The inorganic fibers having an average fiber diameter of 1 to 20 μm have sufficiently high strength and flexibility and thus can improve the shear strength of the holding seal material 52.

The inorganic fibers having an average fiber diameter of less than 1 μm are thin and easily broken and thus have insufficient tensile strength. In contrast, the inorganic fibers having an average fiber diameter of more than 20 μm are not easily bent and thus have insufficient flexibility.

The basis weight (weight per unit area) of the mat to form the holding seal material 52 is not particularly limited, but it is preferably 200 to 4000 g/m$^2$, more preferably 1000 to 3000 g/m$^2$. The mat having a basis weight of less than 200 g/m$^2$ has an insufficient holding force. Thus, the honeycomb filter 1 will easily fall out when the holding seal material 52 formed of such a mat is used to produce the exhaust gas purification device 50.

The mat having a basis weight of more than 4000 g/m$^2$ cannot be easily reduced in its bulkiness.

The bulk density of the mat to form the holding seal material 52 (the bulk density of the holding seal material before wrapping) is not particularly limited, but it is preferably 0.10 to 0.30 g/cm$^3$. When the bulk density of the mat is less than 0.10 g/cm$^3$, the inorganic fibers are weakly entangled and are easily separated, making it difficult to maintain the predetermined shape of the mat.

When the bulk density of the mat is more than 0.30 g/cm$^3$, the mat to form the holding seal material 52 is inflexible. Thus, the holding seal material 52 is poorly wrapped around the honeycomb filter 1 and is easily breakable.

The mat to form the holding seal material 52 may further contain a binder such as an organic binder to reduce the bulkiness or to improve the workability before assembling the exhaust gas purification device 50.

The thickness of the mat to form the holding seal material 52 is preferably 1.5 to 15 mm.

In the exhaust gas purification device 50, the metal casing 51 is preferably mainly made of metal such as stainless steel.

Next, an example of the method for producing the honeycomb fired body of the present invention is described.

The method for producing the honeycomb fired body of the present invention includes the steps of extruding a ceramic raw material from an extrusion die to produce a honeycomb molded body having cell partition walls defining cells; plugging one end of each cell; and firing the honeycomb molded body, wherein the extrusion die for use in the extruding includes a first face, a second face formed opposite to the first face, a ceramic raw material supply section having first through holes extending from the first face to the second face, and a molding section having second through holes extending from the second face to the first face to communicate with the first through holes, the second through holes viewed from the second face form a grid including an outermost peripheral slit for molding an outer wall of the honeycomb molded body, peripheral slits for molding the inter-peripheral-cell cell partition walls between the peripheral cells located at the outermost peripheral region of the honeycomb molded body, and inner slits for molding inter-inner-cell cell partition walls between inner cells located more inward than the peripheral cells, the second face includes an inner grid for forming the inner slits and a peripheral grid located more outward than the inner slits for forming the peripheral slits, all projections of the inner grid viewed from the second face have the same shape that is a rectangle, projections of the peripheral grid viewed from the second face each have a shape formed by reducing the shape of the projections of the inner grid and chamfering or rounding two corners of the reduced shape and the chamfered or rounded corners are adjacent to the outermost peripheral slit, the area of each projection of the peripheral grid viewed from the second face is 60 to 80% of the area of each projection of the inner grid, and the minimum slit width of the peripheral slits is wider than the slit width of the inner slits.

(1-1) Ceramic Raw Material Preparing Step

First, a ceramic raw material as a raw material of the honeycomb fired body 10 is prepared. The ceramic raw material can be prepared by mixing silicon carbide powder, an organic binder, a plasticizer, a lubricant, and water.

The ceramic raw material may optionally contain a pore-forming agent such as balloons that are fine hollow spheres formed of oxide-based ceramic, spherical acrylic particles, or graphite.

Any balloons may be used. Examples thereof include alumina balloon, glass microballoon, shirasu balloon, fly ash balloon (FA balloon), and mullite balloon. Alumina balloon is preferred among these.

(1-2) Extruding Step

Next, the prepared ceramic raw material is extruded from an extrusion die to produce a honeycomb molded body including cell partition walls defining the cells.

The extrusion die for use in this extruding step is described below.

FIG. 8 is a schematic cross-sectional view of an example of the extrusion die for use in the method for producing the honeycomb fired body of the present invention.

The cross-sectional view of FIG. 8 is a cross-sectional view of the extrusion die in a direction parallel to an extrusion direction of a ceramic raw material. In FIG. 8, the extrusion direction of the ceramic raw material is indicated by arrow a.

As shown in FIG. 8, an extrusion die 100 includes a first face 110a, a second face 110b formed opposite to the first face 110a, a ceramic raw material supply section 150 having first through holes 111a extending from the first face 110a to the second face 110b, and a molding section 160 having second through holes 111b extending from the second face 110b to the first face 110a to communicate with the first through holes 111a.

The ceramic raw material supply section 150 has the first through holes 111a formed therein to supply and pass a ceramic raw material therethrough. The molding section 160 has the second through holes 111b formed therein to mold the ceramic raw material that has passed through the ceramic raw material supply section 150 into the shape of a honeycomb molded body.

An outer frame 170 may be optionally formed around the extrusion die 100 to secure the extrusion die 100.

The thickness of the ceramic raw material supply section 150 is preferably 5 to 10 mm. When the ceramic raw material supply section 150 has a thickness of 5 to 10 mm, the molding pressure can be maintained in an appropriate range, which extends the life of the extrusion die.

When the ceramic raw material supply section 150 has a thickness of less than 5 mm, the ceramic raw material supply section 150 is so thin that the load on the molding section 160 is high, which may shorten the life of the extrusion die. In contrast, when the ceramic raw material supply section 150 has a thickness of more than 10 mm, the molding pressure must be set high, and it may be difficult to increase the molding speed. A forced increase in the molding speed will increase the load on the extrusion die 100, which may easily cause various troubles.

The thickness of the molding section 160 is preferably 1 to 4 mm. When the molding section 160 has a thickness of 1 to 4 mm, the molding pressure can be maintained in an appropriate range, and the molded body can be formed in a substantially intended shape.

When the molding section 160 has a thickness of less than 1 mm, the molding section 160 is so thin that the molded body cannot be easily formed in a substantially intended shape, which may easily result in defective products. In contrast, when the molding section 160 has a thickness of more than 4 mm, the molding pressure must be set high, and it may be difficult to increase the molding speed. A forced increase in the molding speed will increase the load on the extrusion die 100, which may easily cause various troubles.

The ratio of the thickness of the molding section 160 to the thickness of the ceramic raw material supply section 150 (thickness of the molding section 160/thickness of the ceramic raw material supply section 150) is preferably 2 to 8, more preferably 2 to 6. When the ratio of the thickness of the molding section 160 to the thickness of the ceramic raw material supply section 150 is in the above range, the molding pressure can be maintained in an appropriate range, and the molded body can be formed in a substantially intended shape. In addition, the life of the extrusion die can be kept long.

When the ratio of the thickness of the molding section 160 to the thickness of the ceramic raw material supply section 150 is less than 2, the molding section 160 is so thin that the molded body may not have a shape as designed or the ceramic raw material supply section 150 is so thick that it may be necessary to increase the molding pressure and it may be difficult to increase the molding speed.

When the ratio of the thickness of the molding section 160 to the thickness of the ceramic raw material supply section 150 is more than 8, the molding section 160 is so thick that it may be necessary to increase the molding pressure and it may be difficult to increase the molding speed or the ceramic raw material supply section 150 is so thin that the load on the molding section 160 is high, which may shorten the life of the extrusion die.

Figure 9A:
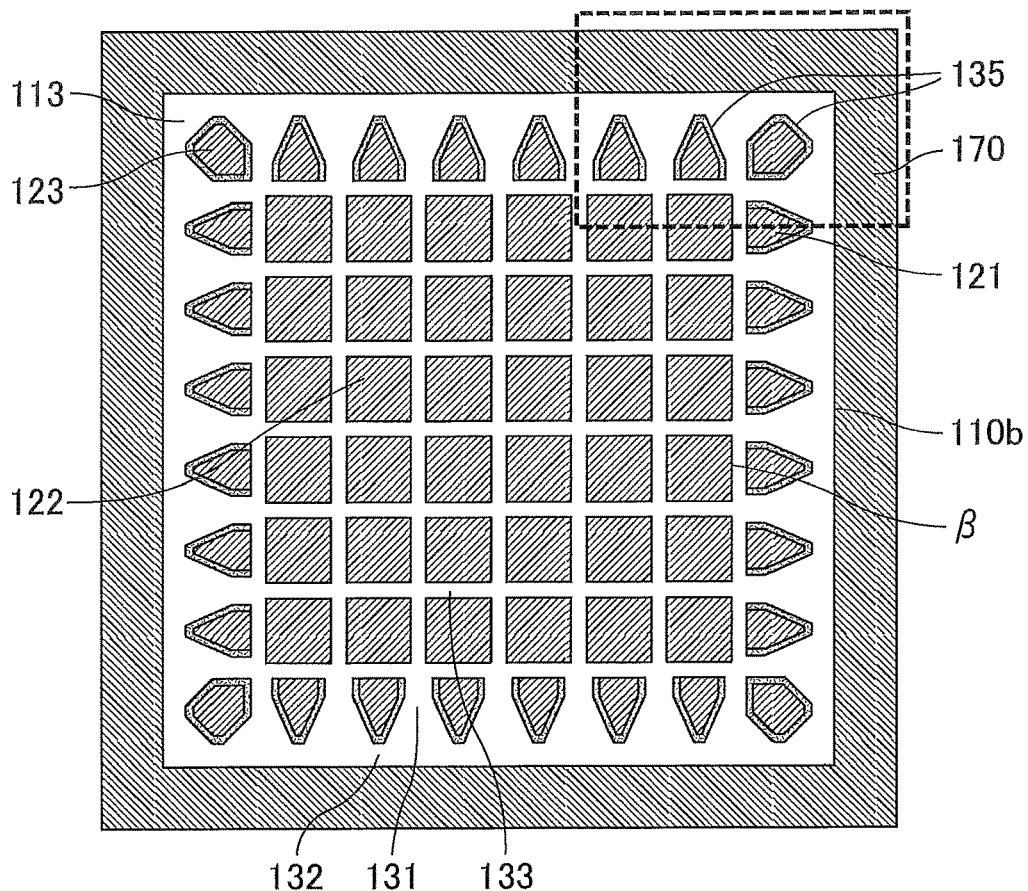
FIG. 9(a) is a plan view of the extrusion die shown in FIG. 8 viewed from its second face.
Figure 9B:
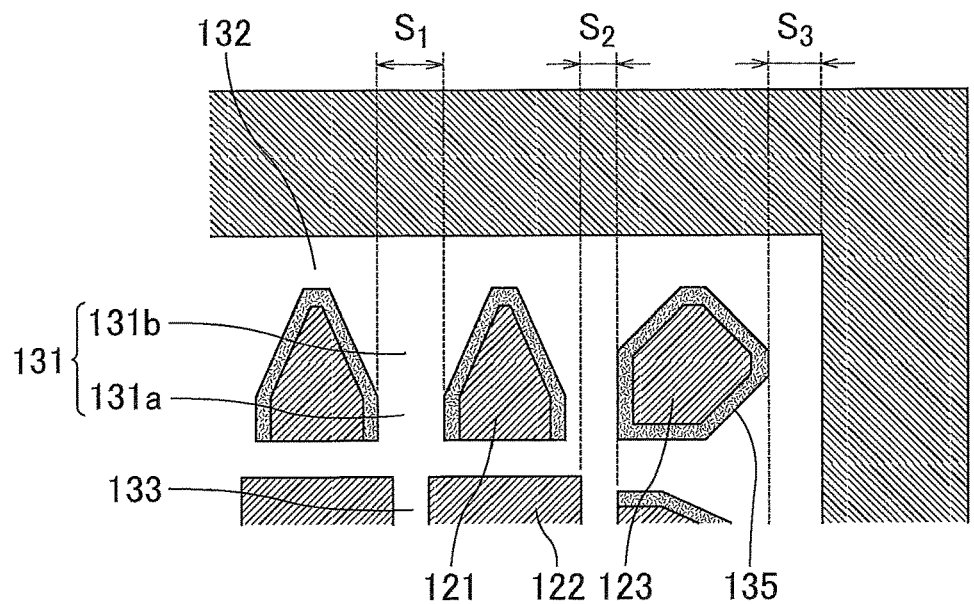
FIG. 9(b) is an enlarged view of the region indicated by dashed lines in FIG. 9(a).

Next, slits of the extrusion die 100 are described. FIG. 9(a) is a plan view of the extrusion die shown in FIG. 8 viewed from its second face. FIG. 9(b) is an enlarged view of the region indicated by dashed lines in FIG. 9(a).

The second through holes 111b viewed from the second face 110b form a grid including an outermost peripheral slit 132 for molding the outer wall 32 of the honeycomb molded body, peripheral slits 131 for molding the inter-peripheral-cell cell partition walls 31 between the peripheral cells 21 located at the outermost peripheral region 12 of the honeycomb molded body, and inner slits 133 for molding the inter-inner-cell cell partition walls 33 between the inner cells 22 located more inward than the peripheral cells 21.

The outermost peripheral slit 132, the peripheral slits 131, and the inner slits 133 are described below in detail with reference to FIGS. 9(a) and 9(b).

The outermost peripheral slit 132 is a slit for molding the outer wall 32 of the honeycomb molded body. Specifically, as shown in FIG. 9(b), in the cross section of the extrusion die 100, the outermost peripheral slit 132 is a slit located outside a line that is formed by connecting the outermost sides of projections of a peripheral grid 121 and a corner grid 123 in the extrusion die 100 among the sides forming the projections of the peripheral grid 121 and the projections of the corner grid 123.

The peripheral slits 131 are slits for molding the inter-peripheral-cell cell partition walls 31 located at the outermost peripheral region 12 of the honeycomb molded body.

Specifically, as shown in FIG. 9(b), a slit between adjacent projections of the peripheral grid 121 and a slit between a projection of the peripheral grid 121 and its adjacent projection of the corner grid 123 are the peripheral slits 131. Each peripheral slit 131 has a constant width region 131a where the slit width is constant from the inner side to the outer side of the extrusion die 100, and an expansion region 131b where the slit width gradually increases. In the peripheral slits 131, the slit width of the constant width region 131a is a minimum slit width $S_1$ of the peripheral slits 131.

The inner slits 133 are slits for molding the inter-inner-cell cell partition walls 33 located more inward than the peripheral cells 21. In other words, as shown in FIG. 9(b), all the slits located more inward than the projections of the peripheral grid 121 are the inner slits 133. For example, a slit located between adjacent projections of an inner grid 122 is one of the inner slits 133. A slit between a projection of the inner grid 122 and its adjacent projection of the peripheral grid 121 is also one of the inner slits 133. A slit width S2 of the inner slits 133 is constant.

In the extrusion die 100, the minimum slit width $S_1$ of the peripheral slits 131 is wider than the slit width $S_2$ of the inner slits 133.

Usually, when a ceramic raw material flows into an extrusion die in which the slit width is not constant, the discharge rate of the ceramic raw material is high at a portion where the slit width is wide, and the discharge rate of the ceramic raw material is low at a portion where the slit width is narrow. Such a difference in the discharge rate of the ceramic raw material flowing through the slits causes a breakage of the cell partition walls to be molded because the ceramic raw material at a high discharge rate drags the ceramic raw material at a low discharge rate.

For example, in the case where the honeycomb molded body is produced using an extrusion die in which each peripheral slit 131 is formed in such a manner that the slit width of the constant width region 131a is equal to the slit width $S_2$ of the inner slits 133 and that the expansion region 131b is formed in the middle toward the outermost peripheral slit 132, the discharge rate of the ceramic raw material flowing through the expansion region 131b is so high that the ceramic raw material drags the ceramic raw material flowing through the constant width region 131a and the inner slit 133. Thus, the cell partition walls 30 to be formed are easily breakable.

However, in the extrusion die 100, the minimum slit width $S_1$ of the peripheral slits 131 is wider than the slit width $S_2$ of the inner slits 133. Thus, the difference in the discharge rate between the ceramic raw material flowing through the expansion region 131b and the ceramic raw material flowing through the constant width region 131a and the inner slits 133 can be reduced. This can prevent defects from occurring in the cell partition walls 30 to be molded.

The minimum slit width $S_1$ of the peripheral slits 131 is preferably 1.5 to 3 times the slit width $S_2$ of the inner slits 133.

The minimum slit width Si of the peripheral slits 131 of the extrusion die 100 is preferably 0.100 to 0.300 mm.

When the minimum slit width $S_1$ of the peripheral slits 131 is less than 0.100 mm, a difference easily occurs in the discharge rate of the ceramic raw material, and the cell partition walls 30 to be molded are susceptible to defects.

When the minimum slit width $S_1$ of the peripheral slit 131 is more than 0.300 mm, the inter-peripheral-cell cell partition walls 31 to be molded are so thick that the resistance upon passage of exhaust gas through the inter-peripheral-cell cell partition walls 31 of the produced honeycomb fired body is high, resulting in an increased pressure loss.

The slit width $S_2$ of the inner slits 133 of the extrusion die 100 is preferably 0.210 mm or less.

The use of the extrusion die 100 enables the production of the honeycomb fired body 10 in which the thickness of the inter-inner-cell cell partition walls 33 is 0.210 mm or less.

Since the cell partition walls 30 of the produced honeycomb fired body 10 are sufficiently thin, the pressure loss in the initial state where PM has not accumulated is sufficiently low. The increase in pressure loss after the accumulation of PM can also be suppressed.

The extrusion die 100 in which the slit width $S_2$ of the inner slits 133 is more than 0.210 mm produces the honeycomb fired body 10 in which thickness of the inter-inner-cell cell partition walls 33 is more than 0.210 mm. In the honeycomb fired body 10 as described above, the inter-inner-cell cell partition walls 33 are so thick that the resistance upon passage of exhaust gas through the cell partition walls is high, resulting in an increased pressure loss.

A minimum slit width $S_3$ of the outermost peripheral slit 132 of the extrusion die 100 is preferably 1.5 to 3 times, more preferably 2 to 3 times the slit width $S_2$ of the inner slits 133. For example, the minimum slit width $S_3$ of the outermost peripheral slit 132 is preferably 0.113 to 0.480 mm.

In the honeycomb fired body 10 produced using the extrusion die 100 described above, the outer wall 32 is sufficiently thick. Thus, the outer frame is mechanically robust and the honeycomb fired body 10 has sufficiently strong against external shock or the like. In addition, since the outer wall 32 of the honeycomb fired body 10 is thick, the heat capacity is not small.

Next, the projections of the inner grid 122 and the projections of the peripheral grid 121 of the extrusion die 100 are described.

As shown in FIG. 9(a), the second face 110b includes the projections of the inner grid 122 for forming the inner slits 133 and the projections of the peripheral grid 121 located more outward than the inner slits 133 for forming the peripheral slits 131. The projections of the corner grid 123 are located at a corner 113 of the second face 110b. The term "peripheral grid" does not include the "corner grid".

As shown in FIG. 9(a), all the projections of the inner grid 122 viewed from the second face 110b have the same shape that is a rectangle β.

In the extrusion die 100, the rectangle β is preferably a square. It is more preferably a square with a side length of 0.5 to 2.0 mm.

In addition, as shown in FIG. 9(a), the projections of the peripheral grid 121 viewed from the second face 110b each have a shape formed by reducing the shape of the projections of the inner grid 122 to obtain a reduced rectangle (a rectangle β), and chamfering or rounding two corners of the reduced shape (rectangle β'). The chamfered or rounded corners are adjacent to the outermost peripheral slit 132.

The rectangle β' may be a shape formed by reducing the rectangle β at the same scale or a shape formed by reducing the rectangle β lengthwise or widthwise. In the latter case, the area of the rectangle β' is preferably 60 to 80% of the area of the rectangle β.

The shape of the projections of the peripheral grid 121 viewed from the second face 110b may be any of the shapes shown in FIGS. 10(a) to 10(e).

FIGS. 10(a) to 10(e) are each a schematic plan view of an example of the shape of the projections of the peripheral grid viewed from the second face of the extrusion die for use in the method for producing the honeycomb fired body of the present invention. The dashed lines shown in FIGS. 10(a) to 10(e) show the rectangle β that is the shape of the projections of the inner grid 122.

Figure 10A:
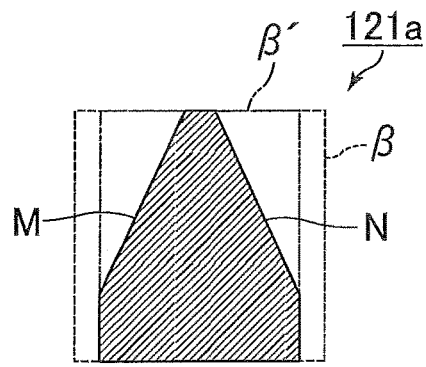
FIGS. 10(a) to 10(e) are each a schematic plan view of an example of the shape of projections of a peripheral grid viewed from the second face of the extrusion die for use in the method for producing the honeycomb fired body of the present invention.

FIG. 10(a) shows the shape of a hexagonal projection of a peripheral grid 121a. In this case, the rectangle β is reduced to a rectangle β' whose width is 0.8 times that of the rectangle β, and two adjacent corners of the rectangle β' are cut by two segments M and N, respectively. The segments M and N are not in direct contact with each other. The segments M and N cross each other outside the rectangle β' when extended. A line between the two cut-out corners, which is a portion forming one side of the rectangle β', forms one side of the hexagon.

Figure 10D:
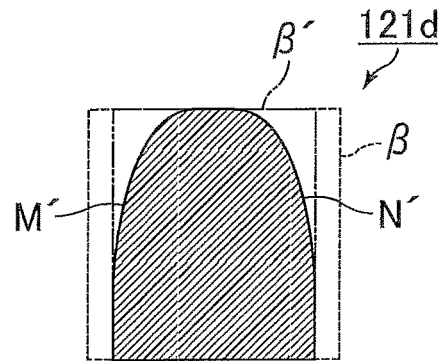
Figure 10B:
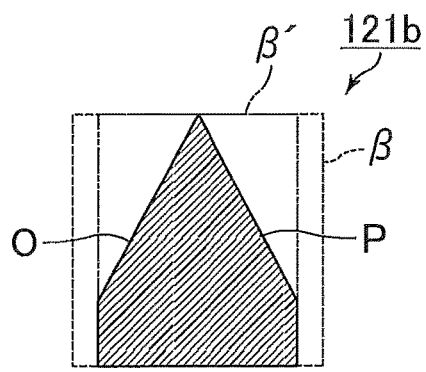

FIG. 10(b) shows the shape of a pentagonal projection of a peripheral grid 121b. In this case, two adjacent corners of the rectangle β' are cut by two segments O and P, respectively. The segment O and the segment P are in contact with each other on one side of the β'. The segment O and the segment P may cross each other inside the rectangle β'. In other words, there is no line as a side of the pentagon between the two cut-out corners.

Figure 10E:
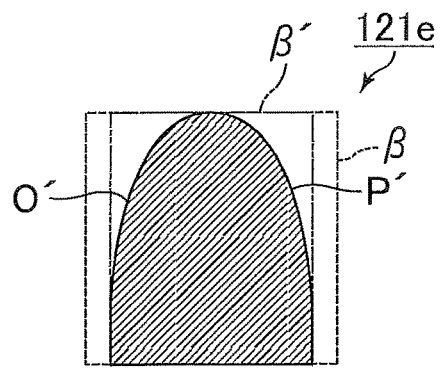
Figure 10C:
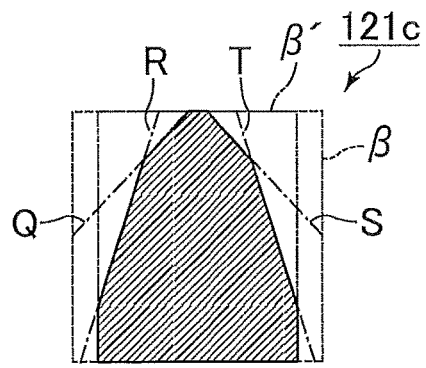

FIG. 10(c) shows the cross-sectional shape of an octagonal projection of a peripheral grid 121c. In this case, one of two adjacent corners of the rectangle β' is cut by segments Q and R, and the other corner is cut by segments S and T. The segment Q and the segment R cross each other inside the rectangle β'. The segment S and the segment T also cross each other inside the rectangle β'. A line between the two cut-out corners, which is a portion forming one side of the rectangle β', forms one side of the octagon.

FIG. 10(d) shows the cross-sectional shape of a projection of a peripheral grid 121d. In this case, two adjacent corners of the rectangle β' are cut by two curves M' and N', respectively. The curves M' and N' are formed by bending the segments M and M in such a manner that the corners of the β' are rounded. A line between the two cut-out corners, which is a portion forming one side of the rectangle β', forms a portion of the contour of the cross-sectional shape of the projection of the peripheral grid 121d.

FIG. 10(e) shows the cross-sectional shape of a projection of a peripheral grid 121e. In this case, two adjacent corners of the rectangle β' are cut by two curves O' and P', respectively. The curves O' and P' are formed by bending the segments O and P in such a manner that the corners of the β' are rounded. The curve O' and the curve P' are in contact with each other on one side of the β'. The curve O' and the curve P' may cross each other inside the rectangle β'.

When the shapes of the projections of the peripheral grid 121 and the projections of the inner grid 122 of the extrusion die 100 are as described above, the honeycomb fired body 10 having the thick wall regions 31b formed therein can be produced. In other words, the volume of the region around the outer wall 32 of the honeycomb fired body 10 can be made sufficiently large. Thus, the outer frame of the produced honeycomb fired body 10 is mechanically robust and the honeycomb fired body has sufficiently strong against external shock or the like. In addition, since the volume of the region around the outer wall 32 is large, the heat capacity is not small in the produced honeycomb fired body 10. Thus, even if the produced honeycomb fired body 10 is heated rapidly, the outer wall 32 can absorb heat and suppress cracks.

In addition, the area of each projection of the peripheral grid 121 viewed from the second face 110b of the extrusion die 100 is 60 to 80% of the area of each projection of the inner grid 122.

When the area relationship between the projection of the peripheral grid 121 and the projection of the inner grid 122 viewed from the second face 110b of the extrusion die 100 is in the above range, the cross-sectional area of each peripheral cell 21 of the produced honeycomb fired body in a plane perpendicular to the longitudinal direction thereof can be adjusted to 60 to 80% of the cross-sectional area of each inner cell 22 in a plane perpendicular to the longitudinal direction thereof. In the honeycomb fired body 10 as described above, the increase in pressure loss is suppressed as described above for the honeycomb fired body 10.

Next, the corner grid 123 is described.

The shape of the projections of the corner grid 123 viewed from the second face 110b of the extrusion die 100 is not particularly limited, but it is preferably a shape formed by chamfering or rounding at least one corner of the rectangle β that is the shape of the projections of the inner grid 122. Alternatively, it may be a shape formed by reducing the rectangle β and chamfering or rounding at least one corner of the reduced rectangle β'. When the shape of the projections of the corner grid 123 is as described above, the volume of the region around the outer wall 32 of the produced honeycomb fired body 10 can be made large.

Since the volume of the region around the outer wall 32 is sufficiently large, the produced honeycomb fired body 10 is sufficiently strong against external shock or the like. In addition, since the volume of the region around the outer wall 32 is large, the heat capacity is not small in the produced honeycomb fired body 10. Thus, even if the produced honeycomb fired body 10 is heated rapidly, the outer wall 32 can absorb heat and suppress cracks.

The shape of the projections of the corner grid 123 viewed from the second face 110b of the extrusion die 100 may be a shape formed by linearly chamfering or rounding all the corners of the rectangle β or the rectangle β' or a shape similar to the shape of the projections of the peripheral grid 121. Alternatively, the shape may be any of the shapes shown in FIGS. 11(a) to 11(d).

FIGS. 11(a) to 11(d) are each a schematic plan view of an example of the shape of a projection of a corner grid viewed from the second face of the extrusion die for use in the method for producing the honeycomb fired body of the present invention.

Figure 11A:
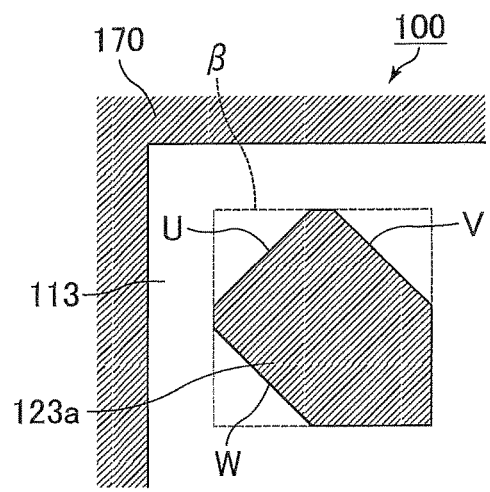
FIGS. 11(a) to 11(d) are each a schematic plan view of an example of the shape of projections of a corner grid viewed from the second face of the extrusion die for use in the method for producing the honeycomb fired body of the present invention.

FIG. 11(a) shows the shape of a heptagonal projection of a corner grid 123a. In this case, among the corners of the rectangle β, except for one corner located most inward of the second face 110b, three corners are cut by three segments U, V, and W, respectively. The segments U and V are not in direct contact with each other. The segments U and V cross each other outside the rectangle β when extended. Also, the segments U and W are not in direct contact with each other. The segments U and W cross each other outside the rectangle β when extended. The segment V and the segment W are parallel to each other. Lines between the three cut-out corners, which are portions forming the sides of the rectangle β, form the sides of the heptagon that is the shape of the projection of the corner grid 123a.

Figure 11C:
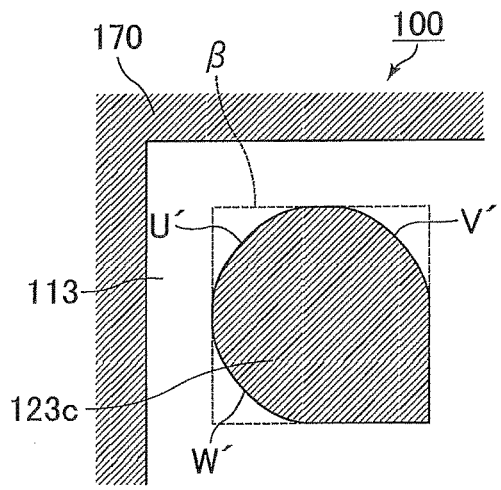
Figure 11B:
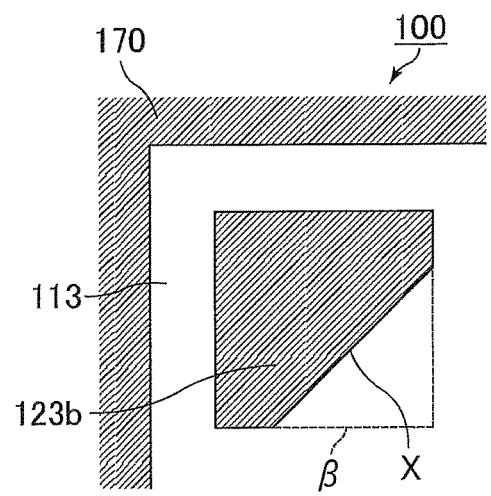

FIG. 11(b) shows the cross-sectional shape of a pentagonal projection of a corner grid 123b. In this case, among the corners of the rectangle β, one corner located most inward of the second face 110b is cut by a segment X.

FIG. 11(c) shows the shape of a projection of a corner grid 123c. In this case, among the corners of the rectangle β, except for one corner located most inward of the second face 110b, three corners are cut by three curves U', V', and W', respectively. The curves U', V', and W' are formed by bending the segments U, V, and W in such a manner that the corners of the rectangle β are rounded. Lines between the three cut-out corners, which are portions forming the sides of the rectangle β, form portions of the contour of the cross-sectional shape of the projection of the corner grid 123c.

Figure 11D:
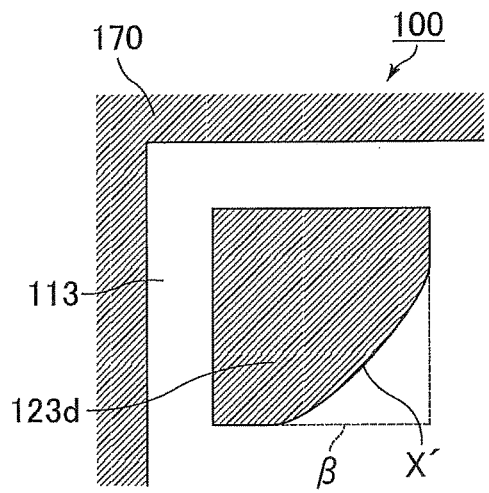

FIG. 11(d) shows the shape of a projection of a corner grid 123d. In this case, among the corners of the rectangle β, one corner located most inward of the second face 110b is cut by a curve X'. The curve X' is formed by bending the segment X in such a manner that the corner of the rectangle β is rounded.

Particularly, when the shape of the projections of the corner grid 123 is as shown in FIG. 11(b) or FIG. 11(d), the produced honeycomb fired body 10 is more resistant to compressive stress, owing to its structure. Thus, the produced honeycomb fired body 10 is sufficiently strong against external shock or the like.

As shown in FIG. 9(b), in the extrusion die 100, a raw material flow suppression section 135 is preferably formed on the inner wall surface of the peripheral slits 131.

As used herein, the term "raw material flow suppression section" refers to a section that is surface-treated to suppress the flow of the raw material.

In the extrusion die 100 for use in the method for producing the honeycomb fired body 10, the slit width $S_2$ of the inner slits 133 is narrower than the minimum slit width $S_1$ of the peripheral slits 131. Thus, the discharge rate of the ceramic raw material flowing through the inner slits 133 is lower than the discharge rate of the ceramic raw material flowing through the peripheral slits 131. Such a difference in the discharge rate of the ceramic raw material causes a breakage of the cell partition walls 30 to be molded because the ceramic raw material at a high discharge rate drags the ceramic raw material at a low discharge rate.

However, when the raw material flow suppression section 135 is formed on the inner wall surface of the peripheral slits 131 of the extrusion die 100, the raw material flow suppression section 135 creates resistance, suppressing the discharge of the ceramic raw material from the peripheral slits 131. As a result, the discharge rate of the ceramic raw material to be extruded from the peripheral slits 131 slows down, and a difference in the discharge rate between the ceramic raw material to be extruded from the peripheral slits 131 and the ceramic raw material to be extruded from the inner slits 133 can be reduced. This can prevent the occurrence of defects in the cell partition walls 30 to be molded.

When the slit width $S_2$ of the inner slits 133 is narrower than the minimum slit width $S_3$ of the outermost peripheral slit 132, the raw material flow suppression section 135 may be formed on the inner wall surface of the outermost peripheral slit 132. In this case, the difference in the discharge rate among the ceramic raw material to be extruded from the peripheral slits 131, the ceramic raw material to be extruded from the inner slits 133, and the ceramic raw material to be extruded from the outermost peripheral slit 132 can be reduced. This can prevent the occurrence of defects in the cell partition walls 30 to be molded.

The raw material flow suppression section 135 may be, for example, a coarsened surface formed by electric discharge machining. Usually, the extrusion die is formed into a predetermined shape by a blade. Thus, during the production of the extrusion die 100, the first through holes 111a and the inner slits 133 are formed by a blade, and subsequently, the peripheral slits 131 and the outermost peripheral slit 132 are formed by electric discharge machining, whereby a coarsened surface can be formed on the inner wall surface of the peripheral slits 131 and the outermost peripheral slit 132. The coarsened surface formed on the inner wall surface of the peripheral slits 131 and the outermost peripheral slit 132 creates resistance, suppressing the flow of the ceramic raw material. As a result, the ceramic raw material to be extruded from the inner slits 133 is less likely to be dragged by the ceramic raw material to be extruded from the peripheral slits 131 or the outermost peripheral slit 132, and is less likely to be broken.

When the raw material flow suppression section 135 is a coarsened surface, the surface roughness Ra is 0.1 to 1.0 µm.

The surface roughness Ra is the center line average roughness based on JIS B 0601 (1994) and can be measured with a device such as a stylus-type surface roughness measuring instrument.

Figure 12:
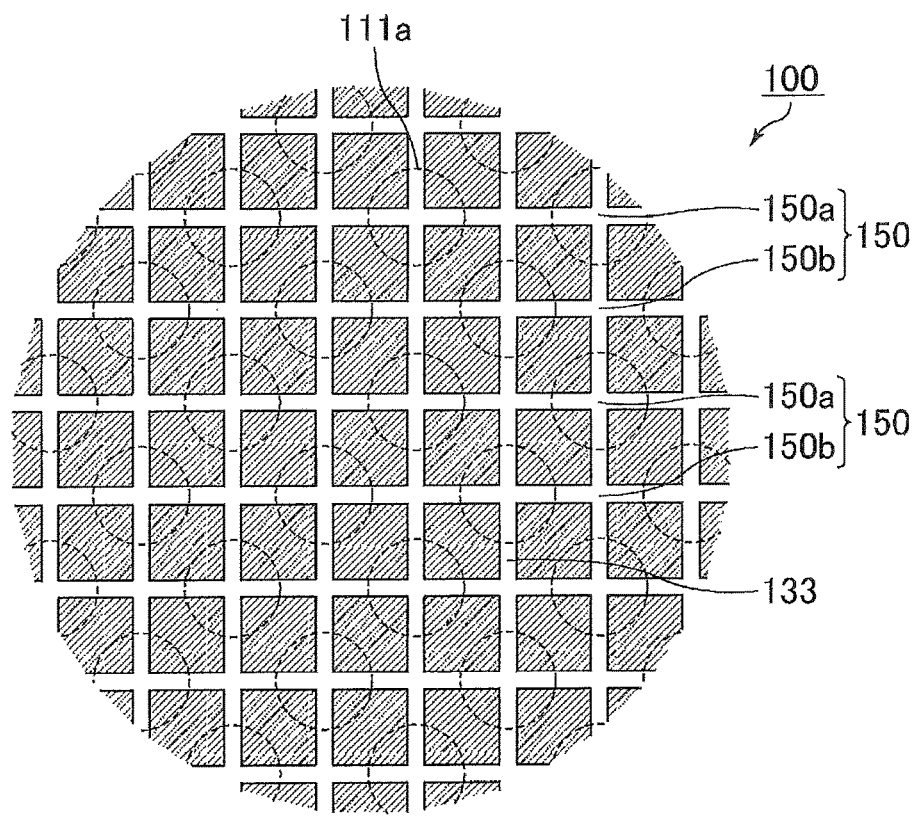
FIG. 12 is an enlarged view of the extrusion die shown in FIG. 8 viewed from its second face.
Figure 13:
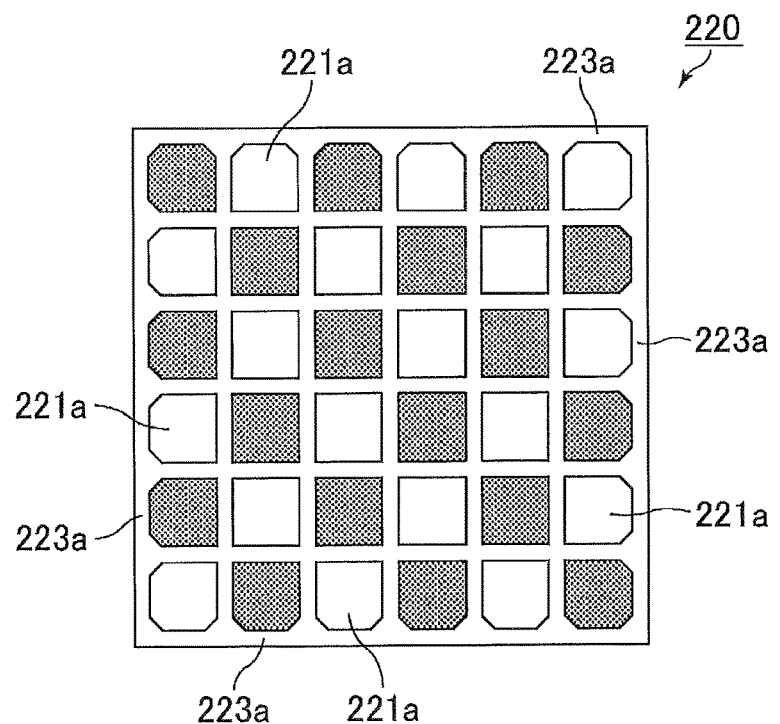
FIG. 13 is cross-sectional view of a porous ceramic member constituting the honeycomb structured body disclosed in Patent Literature 1, in plane perpendicular to the longitudinal direction of the porous ceramic member.

FIG. 12 is an enlarged view of the extrusion die shown in FIG. 8 viewed from its second face.

As shown in FIG. 12, the inner slits 133 (the second through holes 111b) are provided in the form of a grid to communicate with the first through holes 111a of the ceramic raw material supply section 150.

The first through holes 111a of the ceramic raw material supply section 150 are usually provided at portions corresponding to intersections of the slits.

Specifically, as shown in FIG. 12, among intersections of the inner slits 133, one of the adjacent intersections is regarded as 150a and the other is regarded as 150b. In this case, each first through hole 111a is provided at the intersection 150a.

The extrusion die 100 is preferably made of a material such as cemented carbide obtained by sintering a mixture of tungsten carbide and cobalt, cemented carbide obtained by sintering a mixture of tungsten carbide, cobalt, and other particles (such as TiC or TiN), tool steel, stainless steel, or aluminum alloy. Cemented carbide obtained by sintering a mixture of tungsten carbide and cobalt is more preferred.

Usually, cemented carbide obtained by sintering a mixture of tungsten carbide and cobalt has a hardness of 1000 to 1500 Hv.

(1-3) Drying Step

Next, the honeycomb molded body obtained in the extruding step is dried using a dryer such as a microwave dryer, a hot air dryer, a dielectric dryer, a reduced pressure dryer, a vacuum dryer, or a freeze dryer. The honeycomb molded body may be dried using a microwave dryer and a hot air dryer concurrently. Alternatively, the honeycomb molded body may be dried using a microwave dryer until the moisture content is reduced to a certain extent and subsequently using a hot air dryer to completely remove the moisture content in the honeycomb molded body.

(1-4) Plugging Step

In the plugging step, a plug material paste to serve as a plug is placed at one end of each cell of the dried honeycomb molded body to plug the cell.

The plug material paste may be the ceramic raw material.

(1-5) Degreasing Step

Next, the plugged honeycomb molded body is heated at 300° C. to 650° C. for 0.5 to 3 hours to remove organic substances in the honeycomb molded body, whereby a degreased honeycomb body is produced.

(1-6) Firing Step

The degreased honeycomb body obtained in the degreasing step is fired at 1800° C. to 2200° C. for 0.5 to 4 hours in an inert gas atmosphere such as nitrogen or argon atmosphere.

The plug material paste placed at one end of each cell is fired by heating into a plug.

The honeycomb fired body of the present invention can be produced through the above steps.

Next, the method for producing the honeycomb filter of the present invention is described.

(2) Method for Producing Honeycomb Filter (2-1) Adhesive Paste Preparing Step

First, an adhesive paste to combine the honeycomb fired bodies 10 is produced.

The adhesive paste contains, for example, an inorganic binder, an organic binder, and inorganic particles. The adhesive paste may further contain inorganic fibers and/or whiskers.

Examples of the inorganic particles contained in the adhesive paste include carbide particles and nitride particles. Specific examples thereof include silicon carbide particles, silicon nitride particles, and boron nitride particles. These may be used alone or in combination of two or more thereof. The inorganic particles are preferably silicon carbide particles having excellent thermal conductivity.

Examples of the inorganic fibers and/or whiskers contained in the adhesive paste include inorganic fibers and/or whiskers made of silica-alumina, mullite, alumina, silica, or the like. These may be used alone or in combination of two or more thereof. The inorganic fibers are preferably alumina fibers. Alternatively, the inorganic fibers may be biosoluble fibers.

Further, the adhesive paste may optionally contain a pore-forming agent such as balloons that are fine hollow spheres formed of oxide-based ceramic, spherical acrylic particles, or graphite. Any balloons may be used. Examples thereof include alumina balloon, glass microballoon, shirasu balloon, fly ash balloon (FA balloon), and mullite balloon.

(2-2) Assembling Step

The adhesive paste produced in the above step is applied to the lateral sides of each honeycomb fired body to assemble a plurality of honeycomb fired bodies.

Subsequently, the assembled honeycomb fired bodies are heated, whereby the adhesive paste is solidified by heating into an adhesive layer, and an aggregate of the honeycomb fired bodies is produced.

Next, the aggregate of the honeycomb fired bodies 10 is cut with a tool such as a diamond cutter into a round pillar shape.

(2-3) Peripheral Coat Layer Forming Step

Next, a peripheral coat material paste is applied to the periphery of the aggregate of the honeycomb fired bodies obtained in the assembling step, and the peripheral coat material paste is solidified by drying to form a peripheral coat layer.

The peripheral coat material paste may be the adhesive paste described above. Alternatively, the peripheral coat material may be a paste having a composition different from the adhesive paste.

The peripheral coat layer is optional and is not essential.

The honeycomb filter of the present invention can be produced through the above steps.

EXAMPLES

Examples that more specifically disclose embodiments of the present invention are described below, but the present invention is not limited to these examples.

Example 1-1

(1) Production of Honeycomb Fired Body
(1-1) Ceramic Raw Material Preparing Step A mixture was obtained by mixing 52.8% by weight of silicon carbide coarse powder having an average particle size of 22 µm, 22.6% by weight of silicon carbide fine powder having an average particle size of 0.5 µm. To the mixture were added 4.6% by weight of an organic binder (methylcellulose), 0.8% by weight of a lubricant (UNILUB available from NOF Corporation), 1.3% by weight of glycerin, 1.9% by weight of a pore-forming agent (acrylic resin), 2.8% by weight of oleic acid, and 13.2% by weight of water. Thus, a ceramic raw material was prepared.

(1-2) Extruding Step

Next, the ceramic raw material prepared in the ceramic raw material preparing step was extruded into a honeycomb molded body as a precursor of the honeycomb fired body 10.

In the extruding step, an extrusion die having the following shape was used.

The material was cemented carbide obtained by sintering a mixture of tungsten carbide and cobalt. The hardness was 1200 Hv. The thickness of the ceramic raw material supply section was 8.5 mm, and the thickness of the molding section was 2 mm. The minimum slit width $S_1$ of the peripheral slits was 0.305 mm, the slit width $S_2$ of the inner slits was 0.203 mm, and the minimum slit width $S_3$ of the outermost peripheral slit was 0.322 mm. In other words, the minimum slit width $S_3$ of the outermost peripheral slit was about 1.59 times the minimum slit width $S_2$ of the peripheral slits.

The shape of the projections of the inner grid viewed from the second face was a square with a side length of 1.70 mm.

The area of each projection of the peripheral grid was 66.5% of the area of each projection of the inner grid.

The shape of the projections of the corner grid viewed from the second face was as shown in FIG. 11(a), i.e., a shape formed by chamfering three corners of the square shape of the projections of the inner grid. The area of each projection of the corner grid was 70% of the area of each projection of the inner grid.

(1-3) Drying step

Next, the raw honeycomb molded body was dried using a microwave dryer to produce a dried honeycomb molded body.

(1-4) Plugging Step

Subsequently, the cells of the honeycomb molded body were plugged by placing a plug material paste at one end of each cell.

Specifically, the cells were plugged at the end on the exhaust gas inlet side and at the end on the exhaust gas outlet side at positions shown in FIG. 2.

(1-5) Degreasing Step

Subsequently, the dried honeycomb molded body with the plugged cells was subjected to a degreasing treatment at 400° C. for 2 hours. Thus, a degreased honeycomb body was produced.

(1-6) Firing Step

Further, the degreased honeycomb body was subjected to a firing treatment at 2200° C. in an argon atmosphere under normal pressure for 2 hours and 40 minutes.

A honeycomb fired body according to Example 1 was produced through the above steps.

In the produced honeycomb fired body according to Example 1, the porosity was 45%, the average pore diameter was 15 µm, the size was 34.3 mm×34.3 mm×150 mm, the cell density was 31 pcs/cm² (200 cpsi), the minimum thickness of the inter-peripheral-cell cell partition walls was 0.300 mm, the thickness of the inter-inner-cell cell partition walls was 0.200 mm, and the minimum thickness of the outer wall was 0.316 mm.

The cross-sectional shape of the inner cells was a square with a side length of 1.67 mm.

The shape of the peripheral cells was as shown in FIG. 3(a), and the cross-sectional area of each peripheral cell was 66.5% of the cross-sectional area of each inner cell.

Figure 5A:
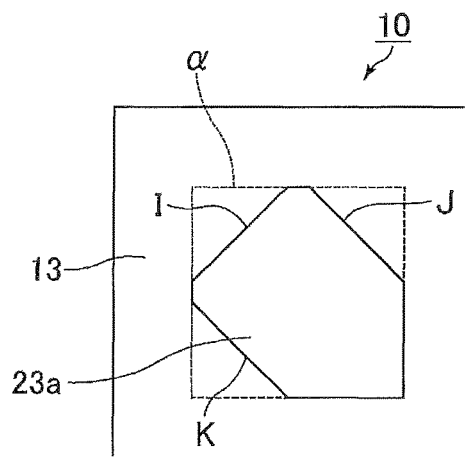
FIGS. 5(a) to 5(d) are each a schematic cross-sectional view of an example of the cross-sectional shape of a corner cell in a plane perpendicular to the longitudinal direction thereof in the honeycomb fired body of the present invention.
Figure 5C:
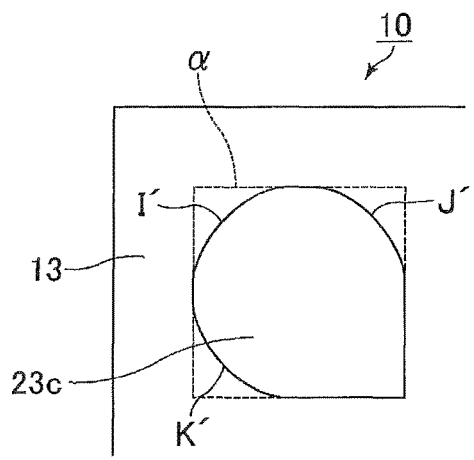
Figure 5B:
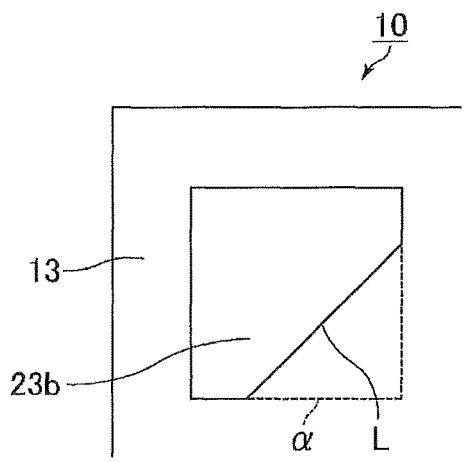
Figure 5D:
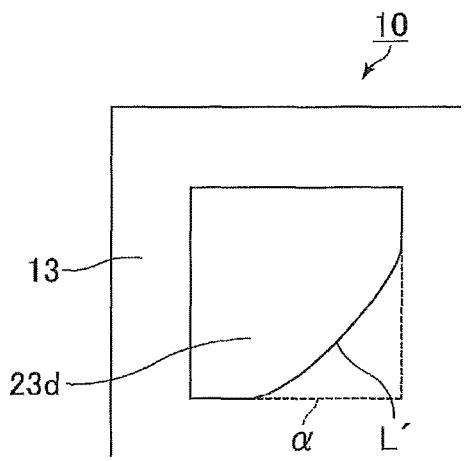

The cross-sectional shape of the corner cells was as shown in FIG. 5(a), i.e., a shape formed by chamfering three corners of the square cross-sectional shape of the inner cells. The cross-sectional area of each corner cell was 70% of the cross-sectional area of each inner cell.

The honeycomb molded body was obtained as a honeycomb fired body through the steps from the drying step (1-3) to the firing step (1-6). Due to slight shrinkage upon drying and firing, the size of the produced honeycomb fired body was 98% of the die dimensions.

Example 1-2 to Example 1-4 and Comparative Example 1-1

Honeycomb fired bodies according to Example 1-2 to Example 1-4 and Comparative Example 1-1 were produced in the same manner as in Example 1-1, except that in the extruding step (1-2), the minimum slit width $S_1$ of the peripheral slits and the percentage of the area of each inner grid relative to the area of each peripheral grid of the extrusion die were changed to produce a honeycomb fired body having a shape in which the minimum thickness $T_1$ of the inter-peripheral-cell cell partition walls and the percentage of the cross-sectional area of each peripheral cell relative to the cross-sectional area of each inner cell were as shown in Table 1.

Example 1-5

A honeycomb fired body according to Example 1-5 was produced in the same manner as in Example 1-1, except that in the extruding step (1-2), the raw material flow suppression section was provided on the inner wall surface of the outermost peripheral slit and the peripheral slits of the extrusion die. The surface roughness Ra of the provided raw material flow suppression section was 0.410 µm.

Table 1 shows the minimum thickness $T_1$ of the inter-peripheral-cell cell partition walls and the percentage of the cross-sectional area relative to each peripheral cell to the cross-sectional area of each inner cell of the produced honeycomb fired body according to Example 1-5.

TABLE 1

|  |  | Minimum thickness $T_1$ (mm) of inter-peripheral-cell cell partition walls | Cross-sectional area of peripheral cell/Cross-sectional area of inner cell (%) | Yield rate (%) |
|---|---|---|---|---|
| Example | 1-1 | 0.300 | 66.5 | 92 |
|  | 1-2 | 0.250 | 69.5 | 88 |
|  | 1-3 | 0.350 | 63.5 | 96 |
|  | 1-4 | 0.400 | 60.5 | 98 |
|  | 1-5 | 0.300 | 66.5 | 96 |
| Comparative Example | 1-1 | 0.200 | 72.5 | 75 |

(Calculation of Yield Rate)

Fifty honeycomb fired bodies were produced in each of Example 1-1 to Example 1-5 and Comparative Example 1-1. Then, a honeycomb fired body with no breakage, holes, or ripples in the cell partition walls were regarded as a non-defective product, and the yield rate was calculated based on the following formula 1. Table 1 shows the calculated yield rate.

Yield rate (%)=(Number of non-defective honeycomb fired bodies/Total number of produced honeycomb fired bodies)×100    Formula 1

As shown in Table 1, an increase in the minimum thickness $T_1$ of the inter-peripheral-cell cell partition walls resulted in a higher yield rate. In addition, the formation of the raw material flow suppression section on the inner wall surface of the outermost peripheral slit and the peripheral slits resulted in a higher yield rate.

Example 2

A honeycomb filter according to Example 2 was produced by the following method.
(1) Preparation of Honeycomb Fired Body
The honeycomb fired body according to Example 1-1 was prepared as a honeycomb fired body for a honeycomb filter.
(2) Production of Honeycomb Filter
(2-1) Adhesive Paste Preparing Step
A heat resistant adhesive paste was prepared by mixing 30% by weight of alumina fibers having an average fiber length of 20 µm, 21% by weight of silicon carbide particles having an average particle size of 0.6 µm, 15% by weight of silica sol, 5.6% by weight of carboxymethyl cellulose, and 28.4% by weight of water.

(2-2) Assembling Step
The adhesive paste was applied to the lateral sides of each prepared honeycomb fired body to assemble the honeycomb fired bodies.

Subsequently, the assembled honeycomb fired bodies were heated at 120° C., whereby the adhesive paste was solidified by heating into an adhesive layer, and an aggregate of the honeycomb fired bodies was produced.

Next, the aggregate of the honeycomb fired bodies was cut with a diamond cutter into a round pillar shape.
(2-3) Peripheral Coat Layer Forming Step
Next, a peripheral coat material paste having the same composition as the adhesive paste was applied to the peripheral side of the honeycomb fired body aggregate, and the peripheral coat material paste was solidified by drying at 120° C. to form a peripheral coat layer. Thus, a honeycomb filter was produced.

The honeycomb filter according to Example 2 was produced through the above steps.

REFERENCE SIGNS LIST

1: honeycomb filter
10: honeycomb fired body
11: plug
12: outermost peripheral region of honeycomb fired body
13: corner of honeycomb fired body
14: adhesive layer
15: peripheral coat layer
20: cell
21, 21a, 21b, 21c, 21d, 21e: peripheral cell
22: inner cell
23, 23a, 23b, 23c: corner cell
30: cell partition wall
31: inter-peripheral-cell cell partition wall
31a: constant width region of inter-peripheral-cell cell partition wall
31b: thick wall region of inter-peripheral-cell cell partition wall
32: outer wall
33: inter-inner-cell cell partition wall
50: exhaust gas purification device
51: metal casing
52: holding seal material
100: extrusion die
110a: first face of extrusion die
110b: second face of extrusion die
111a: first through hole
111b: second through hole
113: corner of second face
121, 121a, 121b, 121c, 121d, 121e: projection of peripheral grid
122: projection of inner grid
123, 123a, 123b, 123c, 123e: projection of corner grid
131: peripheral slit
131a: constant width region of peripheral slit
131b: expansion region of peripheral slit
132: outermost peripheral slit
133: inner slit
135: raw material flow suppression section
150: ceramic raw material supply section
160: molding section
170: outer frame

The invention claimed is:
1. A honeycomb fired body comprising:
a plurality of cells in each of which one end is plugged and which serve as channels of exhaust gas; and
porous cell partition walls defining the cells wherein the honeycomb fired body is formed of SiC, the plurality of cells include peripheral cells located at an outermost peripheral region of the honeycomb fired body and inner cells located more inward than the peripheral cells, all the inner cells have the same cross-sectional shape that is a rectangle in a plane perpendicular to the longitudinal direction thereof, each peripheral cell is defined by the cell partition walls and an outer wall forming a periphery of the honeycomb fired body, the cell partition walls in contact with the outer wall each have a thick wall region where the wall thickness gradually increases toward the outer wall, the cross-sectional shape of the peripheral cells in a plane perpendicular to the longitudinal direction thereof is a shape formed by reducing the rectangular cross-sectional shape of the inner cells to obtain a reduced rectangle and chamfering or rounding two corners of the reduced rectangle, the cross-sectional area of each peripheral cell in a plane perpendicular to the longitudinal direction thereof is 60 to 69.5% of the cross-sectional area of each inner cell in a plane perpendicular to the longitudinal direction thereof, the cell partition walls include inter-peripheral-cell cell partition walls each located between the peripheral cells and inter-inner-cell cell partition walls each located between the inner cells, and the minimum thickness of the inter-peripheral-cell cell partition walls is greater than the thickness of the inter-inner-cell cell partition walls.

2. The honeycomb fired body according to claim 1, wherein the minimum thickness of the inter-peripheral-cell cell partition walls is 0.100 to 0.300 mm.

3. The honeycomb fired body according to claim 1, wherein the thickness of the inter-inner-cell cell partition walls is 0.210 mm or less.

4. The honeycomb fired body according to claim 1, wherein the minimum thickness of the outer wall is 1.5 to 3 times the thickness of the inter-inner-cell cell partition walls.

5. A honeycomb filter, which is formed by combining a plurality of the honeycomb fired bodies according to claim 1 with one another with an adhesive layer therebetween.

6. The honeycomb filter according to claim 5, which is used to purify exhaust gas from a gasoline engine.

7. A method for producing the honeycomb fired body according to claim 1, the method comprising the steps of:

extruding a ceramic raw material from an extrusion die to produce a honeycomb molded body having cell partition walls defining cells;

plugging one end of each cell; and firing the honeycomb molded body, wherein the extrusion die for use in the extruding includes a first face, a second face formed opposite to the first face, a ceramic raw material supply section having first through holes extending from the first face to the second face, and a molding section having second through holes extending from the second face to the first face to communicate with the first through holes, the second through holes viewed from the second face form a grid including an outermost peripheral slit for molding an outer wall of the honeycomb molded body, peripheral slits for molding inter-peripheral-cell cell partition walls between peripheral cells located at an outermost peripheral region of the honeycomb molded body, and inner slits for molding inter-inner-cell cell partition walls between inner cells located more inward than the peripheral cells, the second face includes an inner grid for forming the inner slits and a peripheral grid located more outward than the inner slits for forming the peripheral slits, all projections of the inner grid viewed from the second face have the same shape that is a rectangle, projections of the peripheral grid viewed from the second face each have a shape formed by reducing the shape of the projections of the inner grid and chamfering or rounding two corners of the reduced shape and the chamfered or rounded corners are adjacent to the outermost peripheral slit, the area of each projection of the peripheral grid viewed from the second face is 60 to 69.5% of the area of each projection of the inner grid, and the minimum slit width of the peripheral slits is wider than the slit width of the inner slits.

8. The method for producing the honeycomb fired body according to claim 7, wherein the minimum slit width of the peripheral slits is 0.100 to 0.300 mm.

9. The method for producing the honeycomb fired body according to claim 7, wherein the slit width of the inner slits is 0.210 mm or less.

10. The method for producing the honeycomb fired body according to claim 7, wherein the minimum slit width of the outermost peripheral slit is 1.5 to 3 times the slit width of the inner slits.

11. The method for producing the honeycomb fired body according to claim 7, wherein a raw material flow suppression section is formed on an inner wall surface of the peripheral slits.

* * * * *